US008682957B2

(12) United States Patent
Elson et al.

(10) Patent No.: US 8,682,957 B2
(45) Date of Patent: Mar. 25, 2014

(54) EMBEDDED WIRELESS CLOUD CONNECTOR

(75) Inventors: Jeremy Elson, Redmond, WA (US);
David Molnar, Redmond, WA (US);
Jon Howell, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 5 days.

(21) Appl. No.: 13/397,685

(22) Filed: Feb. 16, 2012

(65) Prior Publication Data
US 2013/0218731 A1   Aug. 22, 2013

(51) Int. Cl.
*G06F 15/173* (2006.01)

(52) U.S. Cl.
USPC ............. 709/201; 709/224; 726/6; 455/414.1

(58) Field of Classification Search
USPC ............. 455/414.1, 432.1; 370/252; 700/295, 700/297; 707/706; 709/201, 203, 204, 217, 709/220, 224; 726/1–10
See application file for complete search history.

(56) References Cited

U.S. PATENT DOCUMENTS

| | | | | |
|---|---|---|---|---|
| 6,055,639 | A * | 4/2000 | Schanze | 726/10 |
| 6,703,869 | B2 * | 3/2004 | Miller et al. | 326/104 |
| 7,024,692 | B1 * | 4/2006 | Schanze et al. | 726/10 |
| 8,285,681 | B2 * | 10/2012 | Prahlad et al. | 707/640 |
| 8,332,617 | B2 * | 12/2012 | Gelson et al. | 711/216 |
| 8,364,326 | B2 * | 1/2013 | Xia et al. | 700/295 |
| 8,495,129 | B2 * | 7/2013 | Wolman et al. | 709/201 |
| 8,544,072 | B1 * | 9/2013 | Masone et al. | 726/6 |
| 8,547,061 | B1 * | 10/2013 | Wong | 320/112 |
| 8,558,179 | B2 * | 10/2013 | Filson et al. | 250/349 |
| 2010/0061250 | A1 | 3/2010 | Nugent | |
| 2011/0145094 | A1 | 6/2011 | Dawson et al. | |
| 2013/0031074 | A1 * | 1/2013 | Vartanian et al. | 707/706 |
| 2013/0041931 | A1 * | 2/2013 | Brand | 709/203 |
| 2013/0110992 | A1 * | 5/2013 | Ravindra et al. | 709/220 |

OTHER PUBLICATIONS

"Wireless, Whispernet and Whispersync", Retrieved at <<http://www.amazon.com/gp/help/customer/display.html?nodeId=200375910>> Retrieved Date: Aug. 11, 2011, pp. 3.

(Continued)

*Primary Examiner* — Andrew Joseph Rudy
(74) *Attorney, Agent, or Firm* — Holly Nguyen; Carole Boelitz; Micky Manhas

(57) ABSTRACT

The current invention is directed to embedded, wireless cloud-connector devices and systems that allow the embedded, wireless cloud-connector devices to be deployed in a variety of embedding devices, applications, and uses. The embedded, wireless, cloud-connector devices to which the current application is directed are implemented using a single integrated circuit, or set of integrated-circuit chips, and each interfaces to a device, product, or system in which the cloud-connector devices are embedded as subcomponents as well as to a communications-services provider. The cloud-connector devices provide data exchange between devices, products, and systems in which they are embedded and cloud providers that provide cloud-computing services, data-message routing, and wireless services through wireless carriers. Embedded, wireless cloud-connector devices, and the systems that interconnect and manage them, allow cloud-providers to extend the cloud-computing domain into many different types of low-cost and geographically dispersed markets and areas of use.

20 Claims, 17 Drawing Sheets

(56) References Cited

OTHER PUBLICATIONS

Jade, Charles, "Why haven't any of the iPad competitors added free 3G service to their devices, similar to Amazon and the Kindle?", retrieved at <<http://gdgt.com/question/why-haven-t-any-of-the-ipad-competitors-added-free-3g-service-to-their-devices-similar-to-amazon-and-the-kindle-g9q/>> Dec. 12, 2010, pp. 2.

"Why MobileMe Wants to Be Free", Retrieved at <<http://www.businessweek.com/technology/content/dec2010/tc20101210_487462.htm>> Retrieved Date: Aug. 11, 2011, pp. 4.

Tofel, Kevin C., "Hands on With Amazon's Cloud Drive, Cloud Player", Retrieved at <<http://gigaom.com/mobile/hands-on-with-amazons-cloud-drive-cloud-player/>> Retrieved Date: Aug. 11, 2011, pp. 12.

"Apple Introduces iCloud, Free Cloud Services Beyond Anything Offered to Date", retrieved at <<http://www.techpowerup.com/147033/Apple-Introduces-iCloud-Free-Cloud-Services-Beyond-Anything-Offered-to-Date.htm>> Retrieved Date: Aug. 11, 2011, pp. 5.

Cloud Computing Free Model—Freemium, Retrieved at <<http://thecustomizewindows.com/2011/11/cloudcomputing-free-model-freemium/>> Retrieved Date: Aug. 11, 2011, pp. 3.

"AWS Free Usage Tier", Retrieved at <<http://aws.amazon.com/free/>> Retrieved Date: Aug. 11, 2011, pp. 2.

"FT232R—USB UART IC", Retrieved at <<http://www.ftdichip.com/Products/ICs/FT232R.htm>> Nov. 4, 2011, pp. 4.

"Kindle Touch 3G", Retrieved at <<http://www.amazon.com/Kindle-Touch-e-Reader-Touch-Screen-3G-Special-Offers/dp/B005890G8O/ref=kin3w_ddp_compare_title2_2?pf_rd_p=1322288542&pf_rd_s=center-18&pf_rd_t=201&pf_rd_i=B0051QVESA&pf_rd_m=ATVPDKIKX0DER&pf_rd_r=04JFDHMV7ARW7AB2SHHR>> Nov. 4, 2011, pp. 8.

"Google+", Retrieved at <<https://plus.google.com/112678702228711889851/posts/eVeouesvaVX#112678702228711889851/posts/eVeouesvaVX>> Nov. 4, 2011, pp. 34.

* cited by examiner

EMBEDDED WIRELESS CLOUD CONNECTOR

TECHNICAL FIELD

The current application is directed to cloud computing and embedded communications devices and, in particular, to an embedded wireless cloud-connector device, an example of which interconnects a vendor product to cloud-resident or cloud-connected vendor application through a wireless carrier, the Internet, and a cloud provider.

BACKGROUND

Electronic computers, electronic communication devices, media, and protocols, and many different types of software applications and electronic services have been developed and have rapidly evolved, during the past 60 years, to form the infrastructure of modern information distribution and a large portion of modern commerce. Computers have evolved from very large, power-inefficient, and low-computing-bandwidth mainframe computers of the 1950s and 1960s to a wide array of economical, power-efficient, and versatile computing systems that feature enormous computational bandwidths, data-storage capacities, and data-transfer bandwidths. Early low-bandwidth proprietary data-transfer devices and communications media have evolved into the Internet and World-Wide Web, by which hundreds of millions of computers distributed across the surface of the earth are interconnected and exchange data at rates sufficient to support real-time streaming of movies as well as many millions of commercial transactions per hour. Mobile telephones have evolved from relatively simple communications devices to sophisticated, multi-processor mobile computing platforms interconnected by radio-frequency communications and wireless carriers with connectivity extending to traditional land-line telephones, the Internet, and personal computers.

The availability of wireless communications, mobile-computing platforms, and other modern technologies provides the basis for even greater evolution of processor-based devices and migration of computing and communications technologies into many new types of uses and applications. However, because computing technologies and platforms and wireless-communications technologies evolved from different initial starting points and were initially separately commercialized, there may be significant technical and commercial barriers to extending computing and communications technologies into new markets, uses, and applications. Researchers and developers, device and systems manufacturers, and a variety of vendors and service providers all continue to seek new methods and technologies to facilitate cost-effective expansion of computer and communications technologies into new markets, uses, and applications.

SUMMARY

The current invention is directed to embedded, wireless cloud-connector devices and systems that allow the embedded, wireless cloud-connector devices to be deployed in a variety of embedding devices, applications, and uses. The embedded, wireless, cloud-connector devices to which the current application is directed are implemented using a single integrated circuit, or set of integrated-circuit chips, and each interfaces to a device, product, or system in which the cloud-connector devices are embedded as subcomponents as well as to a communications-services provider. The cloud-connector devices provide data exchange between devices, products, and systems in which they are embedded and cloud providers that provide cloud-computing services, data-message routing, and wireless services through wireless carriers. Embedded, wireless cloud-connector devices, and the systems that interconnect and manage them, allow cloud-providers to extend the cloud-computing domain into many different types of low-cost and geographically dispersed markets and areas of use. Neither this section nor the sections which follow are intended to either limit the scope of the claims which follow or define the scope of those claims.

DETAILED DESCRIPTION

The current application is directed to various different types of embedded, wireless cloud-connector devices that provide computing/communications hardware and interfaces to allow various different types of geographically dispersed and/or low-cost electronic devices to exchange data with cloud-resident or cloud-connected application programs. The embedded, wireless cloud-connector devices may employ one or more different types of communications modules to connect with mobile-phone carriers, Wi-Fi providers, and other communications-services providers from locations in which wireless service can be obtained. Cloud providers directly contract with wireless carriers, Wi-Fi providers, and other communications-services providers to provide for wireless connections between embedded, wireless cloud-connector devices and cloud-computing facilities that execute or that are interconnected to the application programs with which the geographically dispersed and/or low-cost electronic devices that contain the embedded, wireless cloud-connector devices exchange data. By doing so, and by providing a simple, well-designed interface to the embedded, wireless cloud-connector devices, a cloud provider can extend cloud-computing services into many different, geographically dispersed areas and to a variety of technologies and uses for which traditional wireless-service subscriptions would not be economically feasible.

Figure 1:
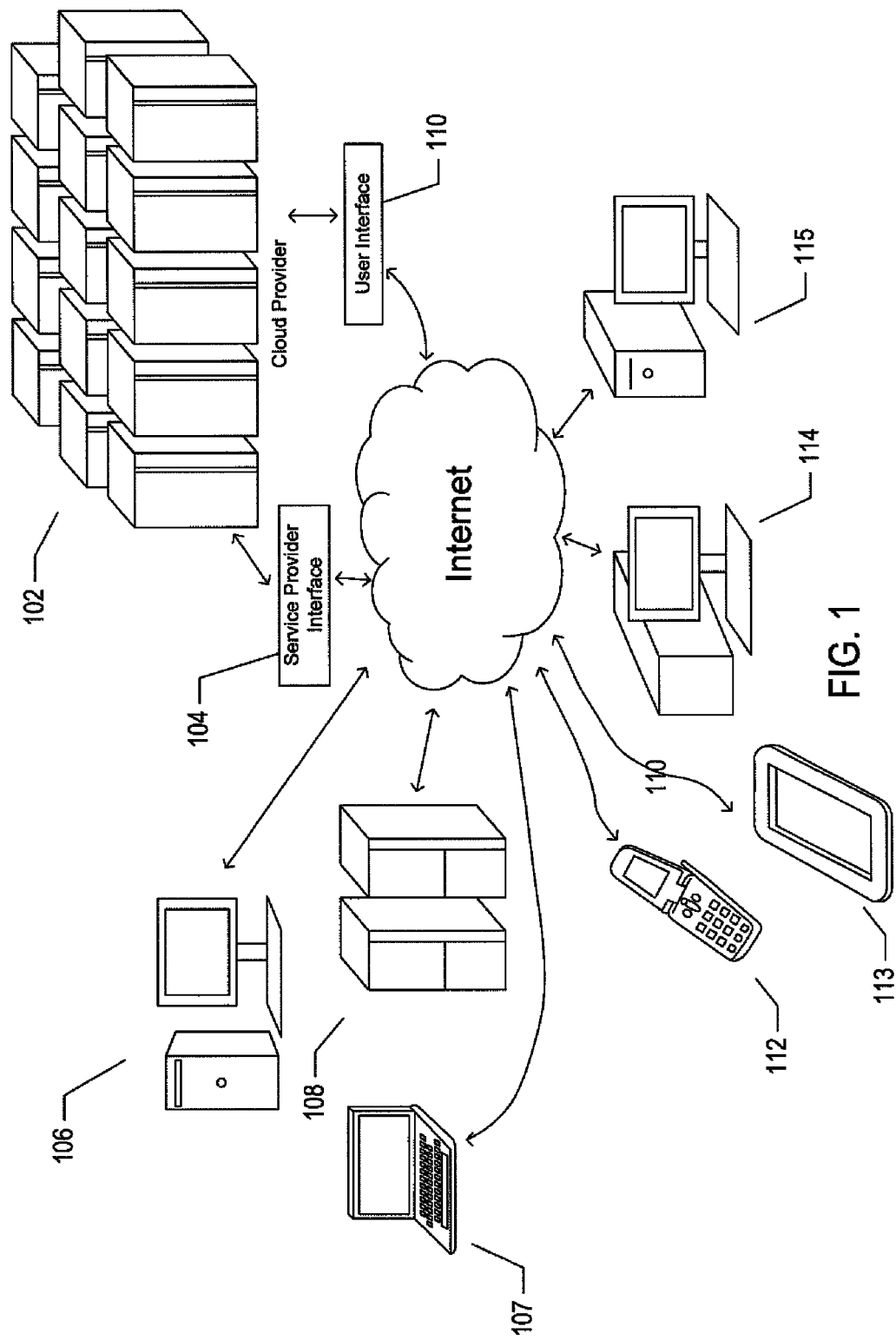
FIG. 1 illustrates cloud computing and the interfaces provided by cloud providers to the cloud-computing facilities that cloud providers maintain and manage on behalf of users of cloud-computing services.

FIG. 1 illustrates cloud computing and the interfaces provided by cloud providers to the cloud-computing facilities that cloud providers maintain and manage on behalf of users of cloud-computing services. Cloud providers 102 manage large numbers of computers, data-storage systems, and communications facilities in order to provider computing services to cloud-services users much like traditional utility companies provide energy and consumables to utility-service customers in the form of metered electrical current, hydrocarbon gas, water, and other forms of energy and consumable materials. Over the past five years, cloud computing has been widely adopted by many different small-sized and medium-sized business organizations, allowing the small-sized and medium-sized business organizations to contract for computing services from cloud providers on an as-needed basis. For example, many businesses deploy Internet-based services on cloud-computing facilities, allowing the businesses to closely tailor the computing services that they contract for and receive from cloud providers to the real-time demand for those services generated by the clients of the businesses. Cloud providers purchase, manage, and maintain physical computing, data-storage, and communications hardware, relieving cloud-computing users from a large fraction of the equipment cost, maintenance, and management overheads associated with purchasing, managing, and maintaining data centers. More importantly, the small-sized and medium-sized businesses contract only for those computing services that they need at particular points in time. Otherwise, the businesses would need to purchase, manage, and maintain sufficient computing and communications facilities to handle peak loads and demands, much of which would be idle during nonpeak-demand operations.

The cloud provider generally provides numerous different interfaces to cloud-computing services. For example, the cloud provider may provide a service-provider interface 104 to small-sized and medium-sized business clients 106-108 which contract with the cloud provider for computing services. A cloud provider, for example, provides interfaces that allow cloud-computing clients to launch virtual machines, application programs, and other computational entities on the cloud-computing facilities. The cloud provider also provides user interfaces 110, such as Internet-Protocol ports, that allow clients 112-115 of service providers 106-108 to access, through the Internet, the services provided by the service-provider clients of the cloud provider. As one example, a service-provider client of the cloud provider may deploy web servers on the cloud-computing facilities that conduct commercial transactions and/or distribute information to users who access service-provider websites through the Internet. As another example, a service provider which provides distributed mobile-phone applications may coordinate distribution of the mobile-phone applications and exchange of information between the mobile-phone applications via service-provider application programs and web servers that execute on the cloud-computing facilities of the cloud provider. In general, both the service providers and service-provider clients access the Internet through Internet service providers ("ISPs") and other communications-services providers. The ISPs generally provide Internet access on a subscription or monthly-fee basis.

Figure 2:
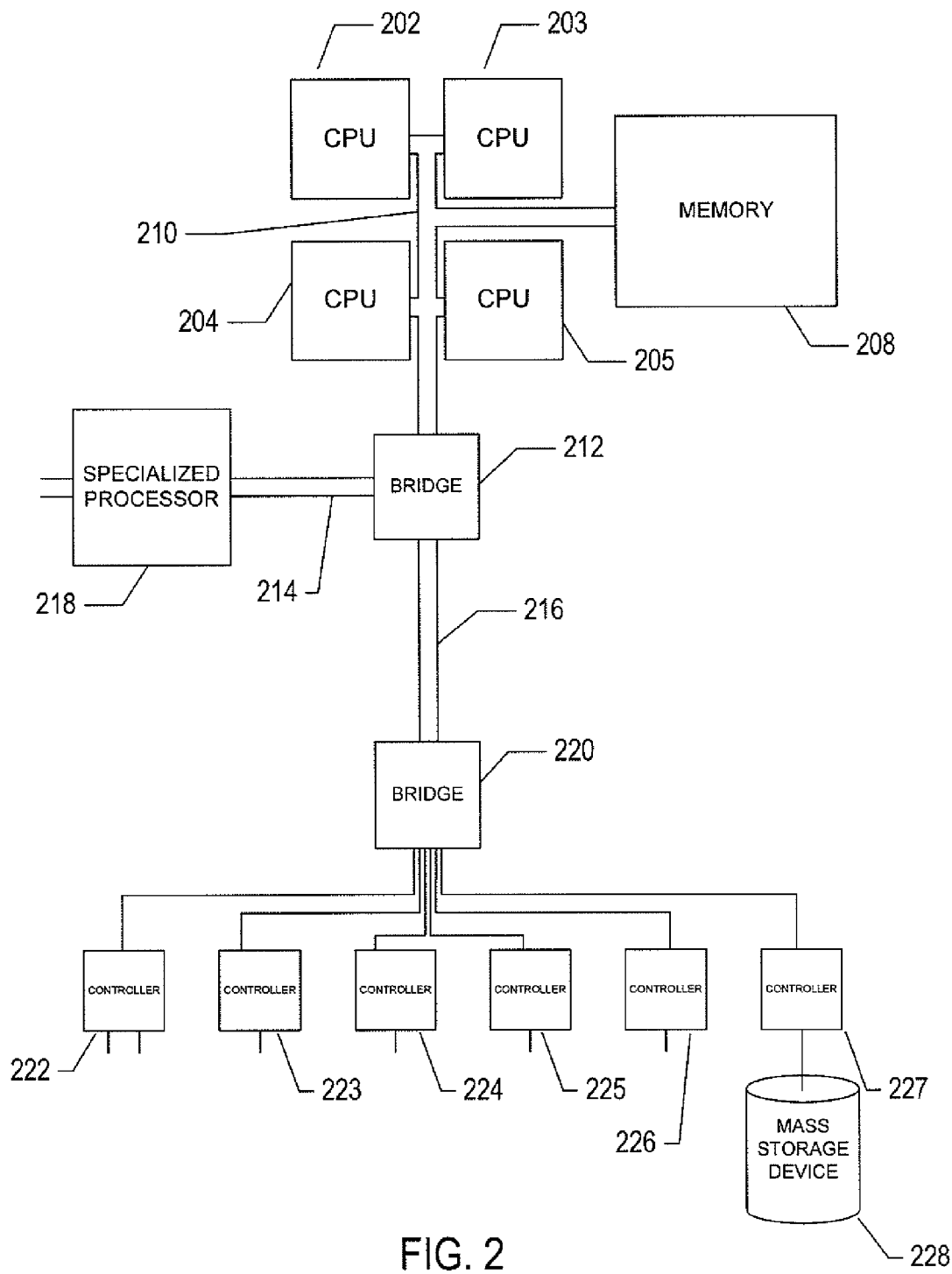
FIG. 2 illustrates a general-purpose computer system.

FIG. 2 illustrates a general-purpose computer system. The computer system contains one or multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216, or other types of high-speed interconnection media, including multiple, high-speed serial interconnects. These busses or serial interconnections, in turn, connect the CPUs and memory with specialized processors, such as a graphics processor 218, and with one or more additional bridges 220, which are interconnected with high-speed serial links or with multiple controllers 222-227, such as controller 227, that provide access to various different types of mass-storage devices 228, electronic displays, input devices, and other such components, subcomponents, and computational resources. Embodiments of the present invention may also be implemented on distributed computer systems and can also be implemented partially in hardware logic circuitry. The cloud-computing computers and computers used by service-provider clients of the cloud provider, and users of services provided by the service providers to access cloud-computing services and interfaces may be described by the general-purpose computer architecture shown in FIG. 2, or by related architectures.

Figure 3:
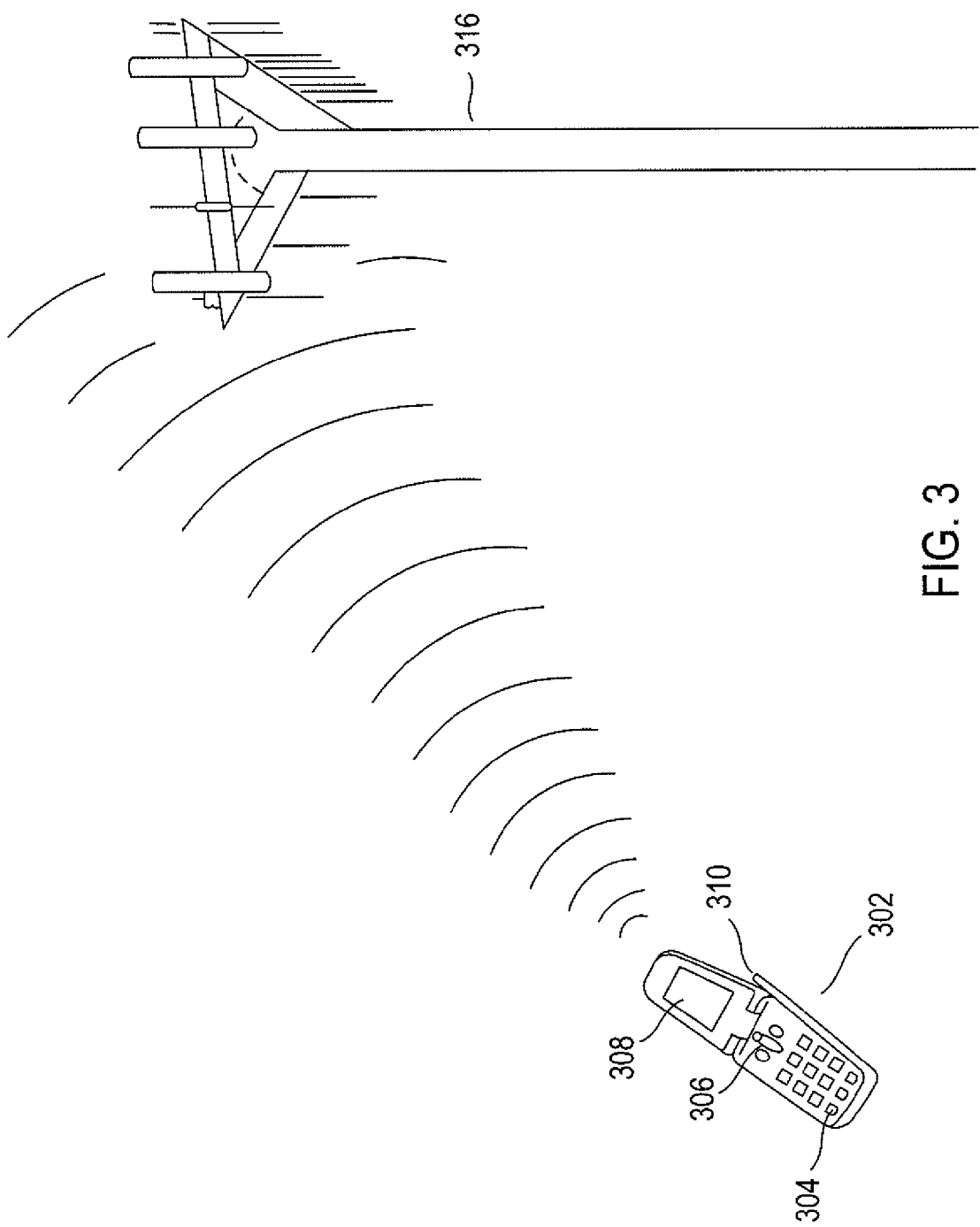
FIG. 3 illustrates a cell phone and cellular radio tower.

FIG. 3 illustrates a cell phone and cellular radio tower. The cell phone 302 is generally a compact, hand-held device that includes alphanumeric-character input keys, such as key 304, for input of numeric and text-character data, various control keys 306, for navigation through user-interface displays and menus, an LCD display 308, and a radio-frequency antenna 310. The cell phone broadcasts radio-frequency signals to, and receives radio-frequency signals from, one or more local cellular radio towers 316. The radio-frequency signals are multiplexed by frequency-division-multiple-access ("FDMA") or code-division-multiple-access ("CDMA") multiplexing to allow many cell telephones to broadcast and receive signals from multiple cellular radio towers within a local geographical area.

Figure 4:
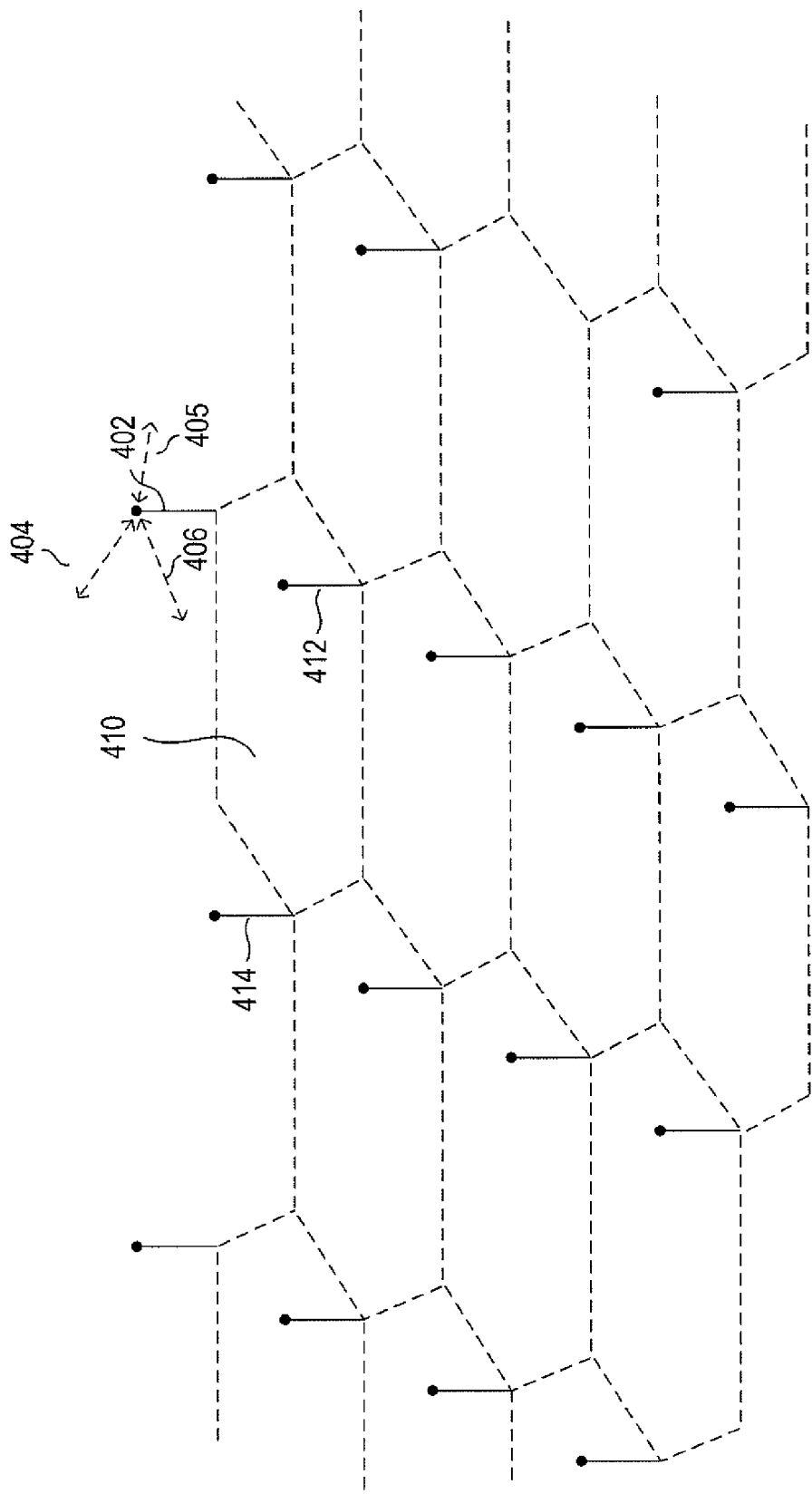
FIG. 4 illustrates partitioning of a geographical region into cells.

The word "cell" in the phrase "cell phone" and the word "cellular" in the phrases "cellular network" and "cellular radio tower" refers to the partitioning of a geographical region into generally hexagonally-shaped sub-regions, referred to as "cells," by the locations and directional broadcast characteristics of a number of cellular radio towers. FIG. 4 illustrates partitioning of a geographical region into cells. In FIG. 4, a large number of cellular radio towers are depicted as vertical line segments capped with a small disk, such as vertical line segment 402. Each cellular radio tower generally includes a three-sided, or triangular, antenna mount that allows for broadcast and reception or radio signals roughly aligned with three directional, co-planar axes separated from one another by 120°, such as the three axes 404-406 shown for cellular radio tower 402. The geographical region is subdivided into hexagonal cells, indicated in FIG. 4 by dashed lines. Hexagonal cell 410 is served by cellular radio towers 402, 412, and 414, each with a directional broadcast axis directed towards the center of the cell. A cell-telephone user may walk or drive from one cell to another, and the network of cellular radio towers, associated base stations connected to a complex telecommunications network, allows the telecommunications network to transfer the mobile-electronic device, in real time, from broadcasting and receiving signals from the cellular radio towers associated with one cell to those associated with another, without interruption in an on-going phone call or electronic data-exchange operation.

There are a variety of different types of mobile telecommunications systems. One common mobile telecommunications system is referred to as the "universal mobile telecommunication system" ("UMTS"), one of several third-generation ("3G") mobile telecommunications technologies. The UMTS system supports data transfer rates up to 21 Mbit/second, although, with current handsets, maximum data-transfer rates generally do not exceed 7.2 Mbit/second. UMTS systems provide for cells of varying sizes, depending on population density, presence of buildings and other obstacles, and other considerations. In rural areas, cellular telephone towers may be separated by distances greater than 30 miles, while, in certain urban environments, a cell may span a single floor of a building.

Figure 5:
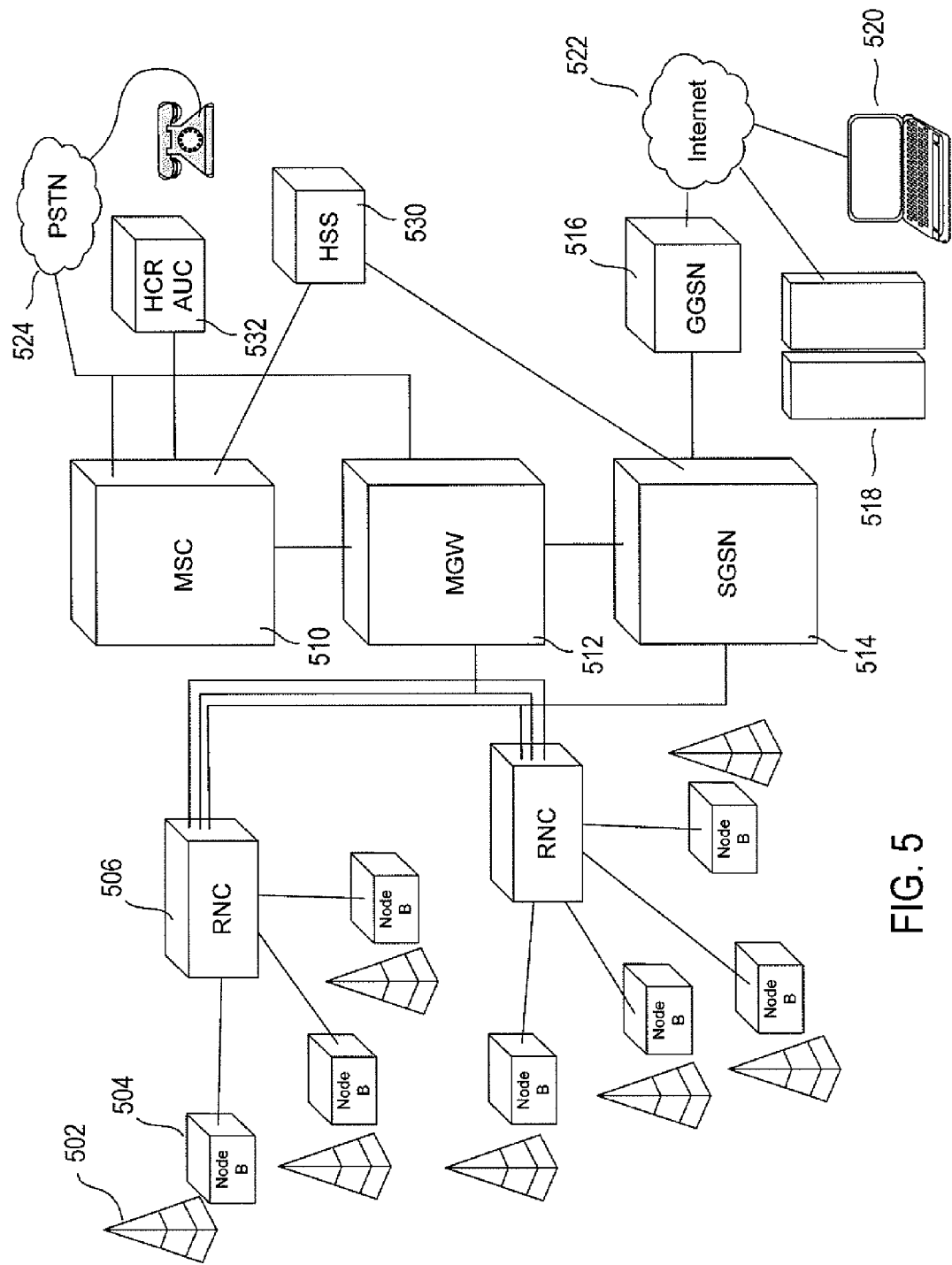
FIG. 5 illustrates certain of the components of a 3G telecommunications network.

FIG. 5 illustrates certain of the components of a 3G telecommunications network. In FIG. 5, cellular telephone towers and other antennas are indicated by antenna-like symbols, such as antenna-like symbol 502. Each cellular radio tower, or other antenna, is associated with a Node B base station, such as Node B base station 504 with which antenna 502 is associated. A single Node B base station may be associated with multiple antennas or cellular radio towers. The base stations include power amplifiers, digital-signal processors, and back-up batteries, and are generally responsible for broadcasting signals received by the base station from the cellular network to cell phones within the geographical area serviced by the base station and for forwarding signals received from cell phones to the cellular network. Base stations are directly connected to radio network controllers ("RNC"), such as RNC 506 in FIG. 5. Each RNC may be connected to multiple base stations. The RNCs are, in turn, connected to various components of the core cellular network, including a mobile switching center ("MSC") 510, a media gateway ("MGW") 512, and a serving CPRS support node ("SGSN") 514, the acronym "GPRS" standing for "general packet radio service." The SGSN 514 interconnects RNCs, via gateway GPRS support nodes ("GGSN") 516, to remote computing systems 518 and 520 via the Internet 522. The MSC 510 interconnects RNCs with a public switched telecommunications network ("PSTN") 524. The MGW 512 is concerned with data transfer in both circuit-based switch networks, such as PSTN, as well as in packet-based switch networks, such as the Internet, and is controlled by SGSNs and MSCs. Many additional components are included in the core telecommunications network, including a home-subscriber-server facility 530, home-location-register and authentication center 532, and many additional components and nodes not shown in FIG. 5.

Figure 6:
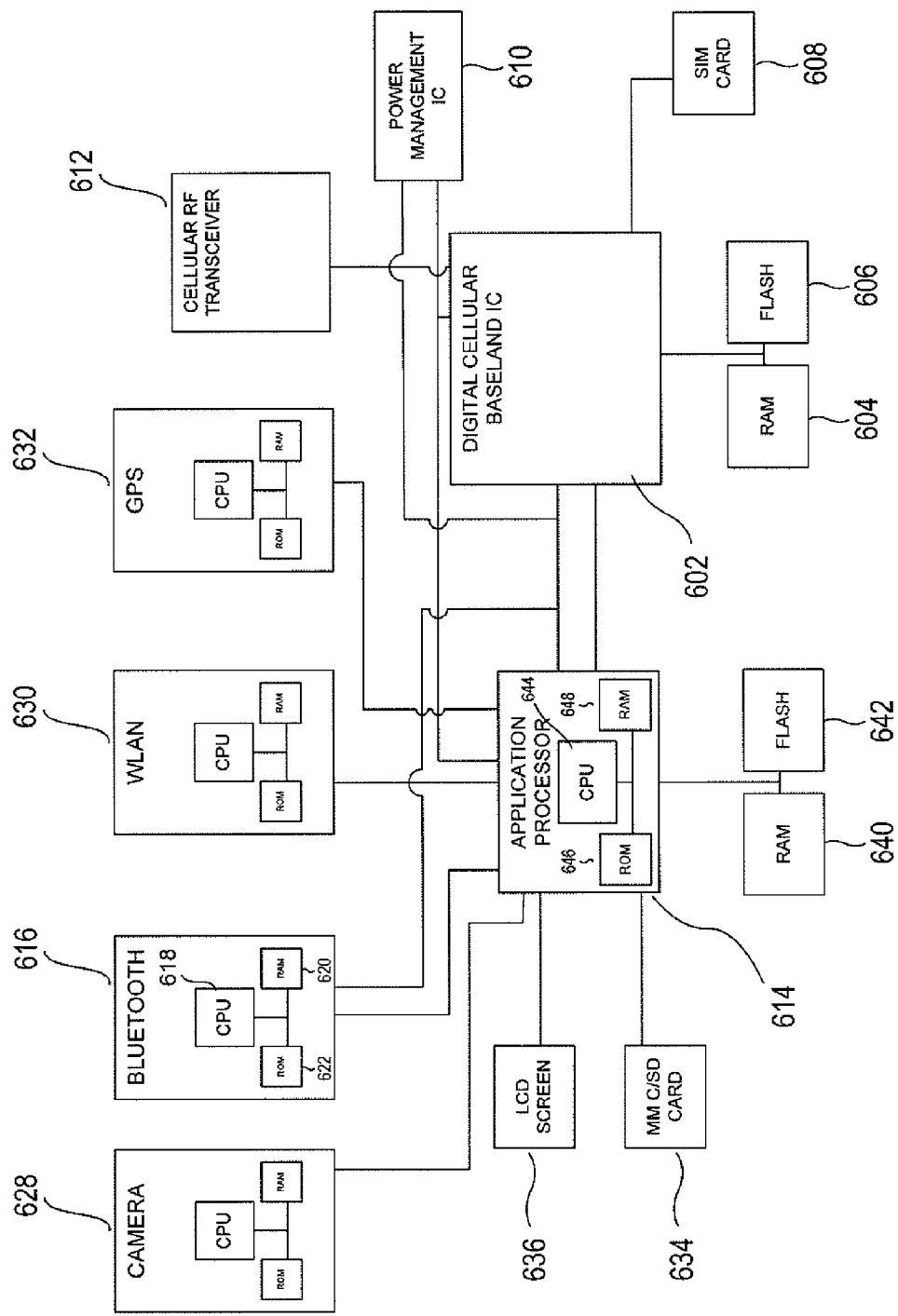
FIG. 6 provides a high-level block diagram for certain of the internal components of a cell phone.

FIG. 6 provides a high-level block diagram for certain of the internal components of a cell phone. These components include a dual-core digital cellular baseband integrated circuit 602, which converts analog radio signals to digital signals and digital signals to analog signals, manages communications-protocol layers, and runs certain cell telephone applications, including applications responsible for initiation of phone-calls and maintenance of a locally-stored phone book, and a portion of the cell-phone user interface. The digital cellular baseband integrated circuit is interconnected with external RAM 604 and flash 606 memory, a subscriber identity module ("SIM"), or SIM card, 608, a power-management integrated circuit 610, a cellular radio-frequency ("RE") transceiver 612, a separate application processor integrated circuit 614, and a Bluetooth module 616 that includes a processor 618 and both RAM 620 and ROM memory 622. The application processor 614 provides the computational bandwidth to a variety of non-radio-communications applications, including digital-camera-based applications, Internet browser, games, networking, and GPS-related functions. An application processor may be connected to a video camera 628, a WEAN module 630, a OPS module 632, an MMC/SD card 634, and an LCD screen 636. The application processor is additionally interconnected with external RAM 640 and flash 642 memory, and includes a processor 644 and internal ROM 646 and RAM 648 memory. On modern cell phones, the display screen 636 is generally a touch screen that both displays graphics, text, and images and that receives user input. The user input includes touch input at particular screen positions and/or continuous motions including one or more of initial points of motion, directions and paths of motion, and final points at which the motion stops.

Figure 7:
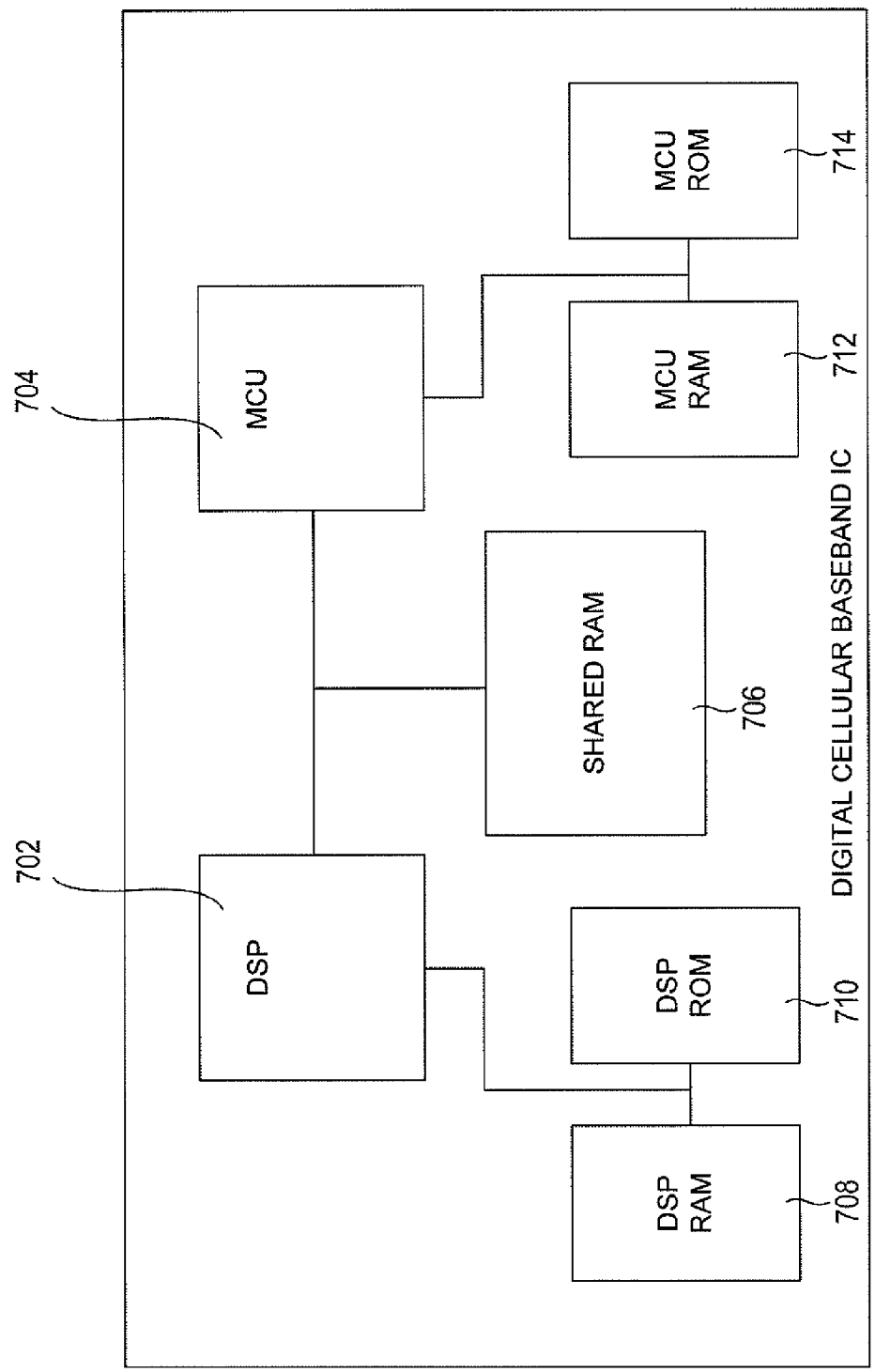
FIG. 7 shows a high-level block diagram for a digital cellular baseband integrated circuit.

FIG. 7 shows a high-level block diagram for a digital cellular baseband integrated circuit. The digital cellular baseband integrated circuit includes a digital signal processor ("DSP") 702, a microcontroller 704, shared internal RAM 706, and DSP-associated RAM 708 and ROM 710 as well as microcontroller-associated RAM 712 and ROM 714.

Figure 8:
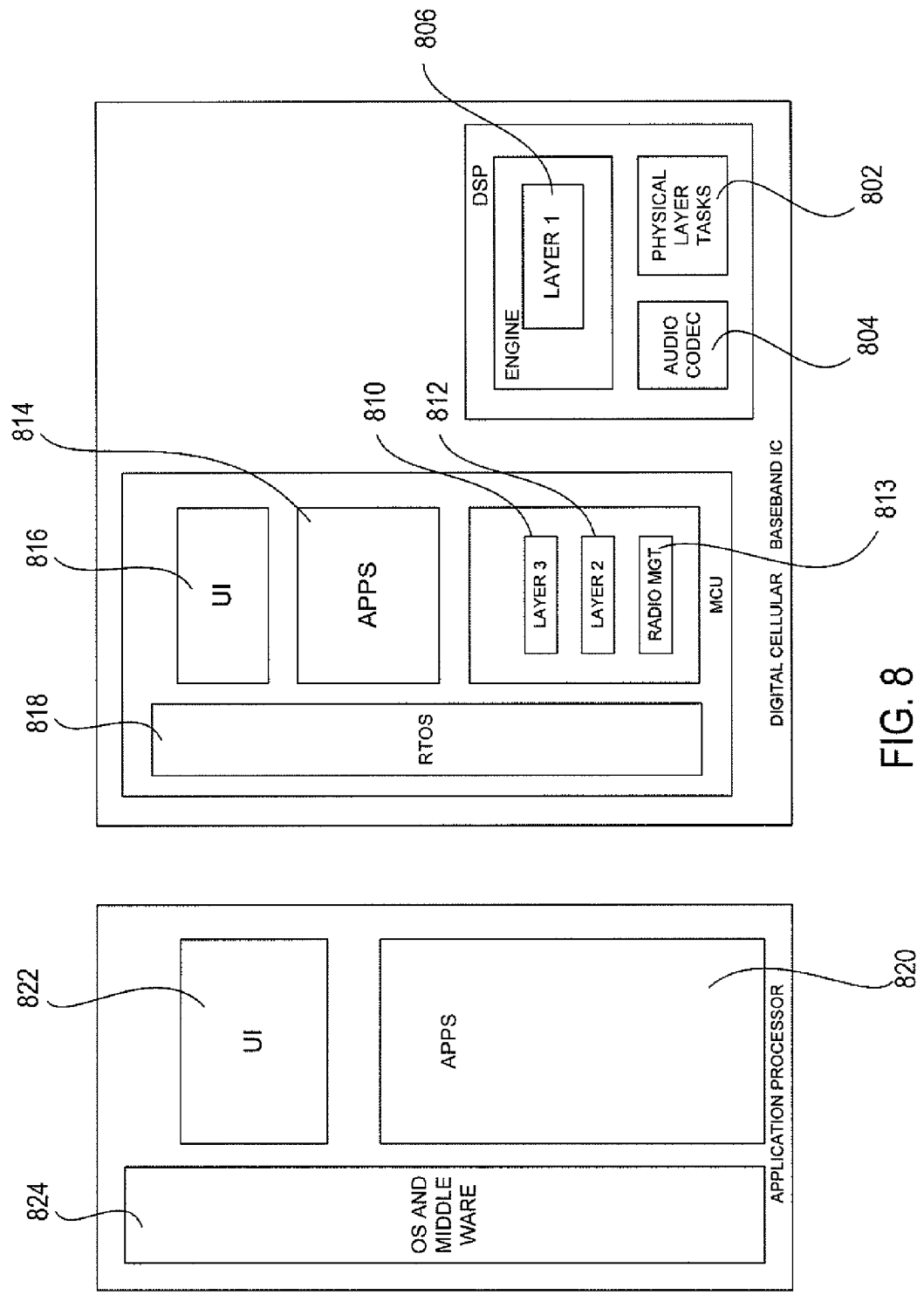
FIG. 8 provides a high-level block diagram of the software architecture for a cellular telephone.

FIG. 8 provides a high-level block diagram of the software architecture for a cellular telephone. The DSP (702 in FIG. 7) is responsible for the physical layer of the protocol stack associated with RF broadcast and reception 802, provides an audio codec 804, and carries out tasks associated with the first layer of a three-layer communications-protocol stack 806. The microcontroller (704 in FIG. 7) executes software that implements the upper two layers of the three-layer protocol stack 810 and 812, various radio-management functions 814, and executes certain applications 814 and user-interface routines 816 layered above a real-time operating system 818. For example, the microcontroller may store and manage a local phone book and provide a user-interface ("UI") for initiating and answering phone calls, via a phone application the executes on the microcontroller. The application processor (614 in FIG. 6) runs numerous software applications 820 and UI routines 822 above an operating system and a middle-ware layer 824.

A cell phone thus generally contains, at a minimum, three processors, including an application processor, microcontroller, and DSP, and often as many as six or more processors, including processors within separate Bluetooth, GPS, and WLAN modules. The cell phone includes various different electronic memories, some integrated with the processors and others external to the processors and interconnected with the processors via memory busses.

Figure 9A:
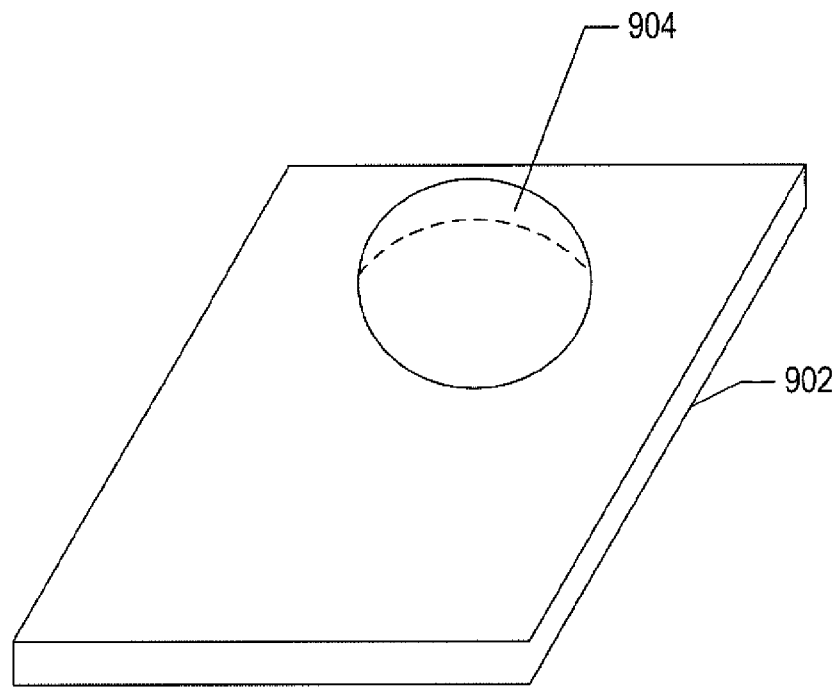
FIGS. 9A-B illustrate a microsensor.
Figure 9B:
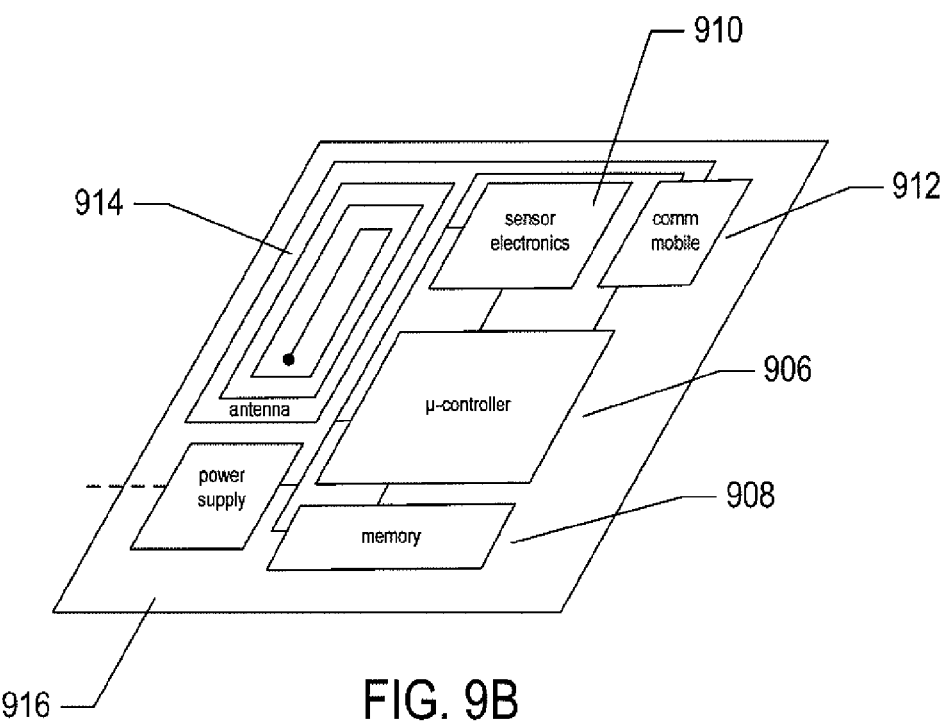

FIGS. 9A-B illustrate a microsensor. FIG. 9A provides an external view of microsensor 902. The microsensor shown in FIGS. 9A-B is a small, thin rectangular device with a port 904 through which the sensor receives one or more types of physical signals from the environment surrounding the microsensor, including electromagnetic radiation, volatile chemical compounds, and forces due to acceleration of the microsensor. FIG. 9B illustrates internal components of the microsensor. These internal components include a microcontroller 906, memory accessed by the microcontroller 908, sensor electronics 910 that interface to a sensor device, a communications-module integrated circuit 912, a wireless antenna 914, and a power supply 916 which supplies power to the microprocessor, memory, sensor electronics, and communications module. The power supply may distribute electrical power obtained from an external source, such as a power line or from an internal battery. In certain types of microsensors, power is supplied from the RF antenna when RF electromagnetic radiation impinges on the antenna. Certain types of microsensors may also generate electrical power from environmentally-available electromagnetic radiation or chemical substances.

There are many different types of microsensors and larger sensors that are currently commercially available. They range from tiny RF tags placed in garments and merchandize by retailers and microchips injected into domestic animals to a large variety of chemical sensors, optical sensors and cameras, mechanical sensors, radiation sensors, and other sensors deployed in a wide variety of different types of systems, devices, and products as well as in many different types of environmental locations for research and monitoring purposes. Because microsensors are micro-processor or micro-controller controlled, they can be programmed to carry out a wide variety of different sensing and communications tasks.

Figure 10:
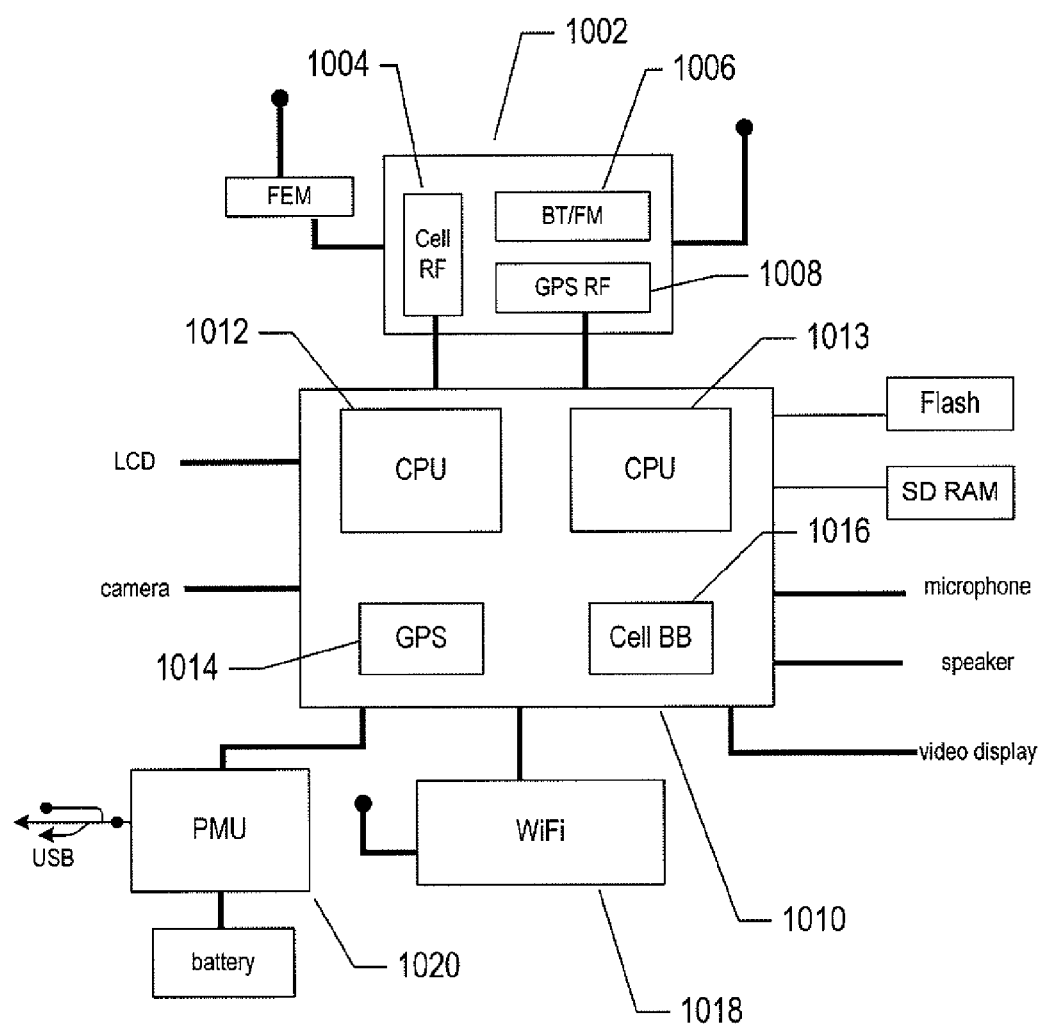
FIG. 10 illustrates one mobile-phone chip set currently used to implement various different types of smart phones.

Recently, in order to reduce the cost and power consumption of mobile phones, various integrated-circuit manufacturers have produced specialized integrated circuits and chip sets for mobile phones that include the integrated circuits or chip sets as subcomponents or sets of subcomponents. FIG. 10 illustrates one mobile-phone chip set currently used to implement various different types of smart phones. The chip set includes four discrete integrated circuits: (1) a communications integrated circuit 1002 that provides the control logic for cell-phone RF communications 1004, Bluetooth communications 1006, and global-positioning-servers ("GPS") RF communications 1008; (2) a processor integrated circuit 1010 that includes multiple CPUs 1012-1013 and specialized processing circuits for GPS 1014 and cell communications 1016; (3) a Wi-Fi communications module 1018; and (4) a power-management-unit integrated circuit 1020. These four integrated circuits 1002, 1010, 1018, and 1020 together provide necessary processing functionality for various types of smart phones and other mobile computing-and-communications devices. Thus, the current trend in mobile communications development is to incorporate more and more complex functionality into fewer, smaller, and lower-power-consuming integrated circuits can be produced at low unit cost in high volumes.

With processing functionality and communications functionality incorporated in one or a few low-power-consuming integrated circuits, with ubiquitous cell-phone communications and Wi-Fi communications services, and with the advent of cloud-computing services, many attractive new markets and uses for processor-controlled communications devices and sensors that interconnect with cloud services can be imagined. For example, researchers could design and deploy myriad cloud-connected sensors and monitoring devices in various different environments in order to collect, in real time, a variety of different types of environmental data and analyze the data using centralized, highly parallel application programs hosted on cloud-computing facilities. Cloud-connected devices could be incorporated into a variety of different types of products in order to track and monitor the products in order to, in turn, provide many different new services and facilities to cloud-computing customers. For example, cloud-connected monitors could be embedded in products to allow purchasers of the product to locate or disable the products should they be lost or stolen. In another example, a parcel-delivery service could embed cloud-connected monitors into parcels, parcel-delivery vehicles, and other mobile entities in order to track and manage the flow of parcels through the various transport and distribution facilities managed by the parcel-delivery service.

Clearly, the computing and communications hardware needed to implement all of these various monitoring and tracking systems is currently available. However, significant barriers prevent realization of these various types of tracking and monitoring systems that represent extensions of cloud computing to various high-volume, low-cost, geographically dispersed applications. One barrier is the technical hurdle involved in incorporating computing and communications integrated circuits into products by companies and organizations which do not routinely carry out micro-systems development and integration. The design and development efforts needed to incorporate computing and communications integrated circuits and chip sets into products and monitoring devices is decidedly non-trivial. Moreover, developing the software and communications modules to interconnect these devices with Wi-Fi providers, wireless carriers, and other communications-services providers is also a non-trivial and technically demanding task. However, a very significant hurdle to extending cloud computing into geographically diverse and low-cost, high-volume applications is the need to contract with wireless carriers and other communications-services providers for communications services for all of the myriad cloud-connected products and devices that researchers and businesses may wish to produce and deploy. A subscription-based or monthly-fee-based contract would be clearly economically infeasible and impractical in these low-cost, high-volume applications.

Figure 11:
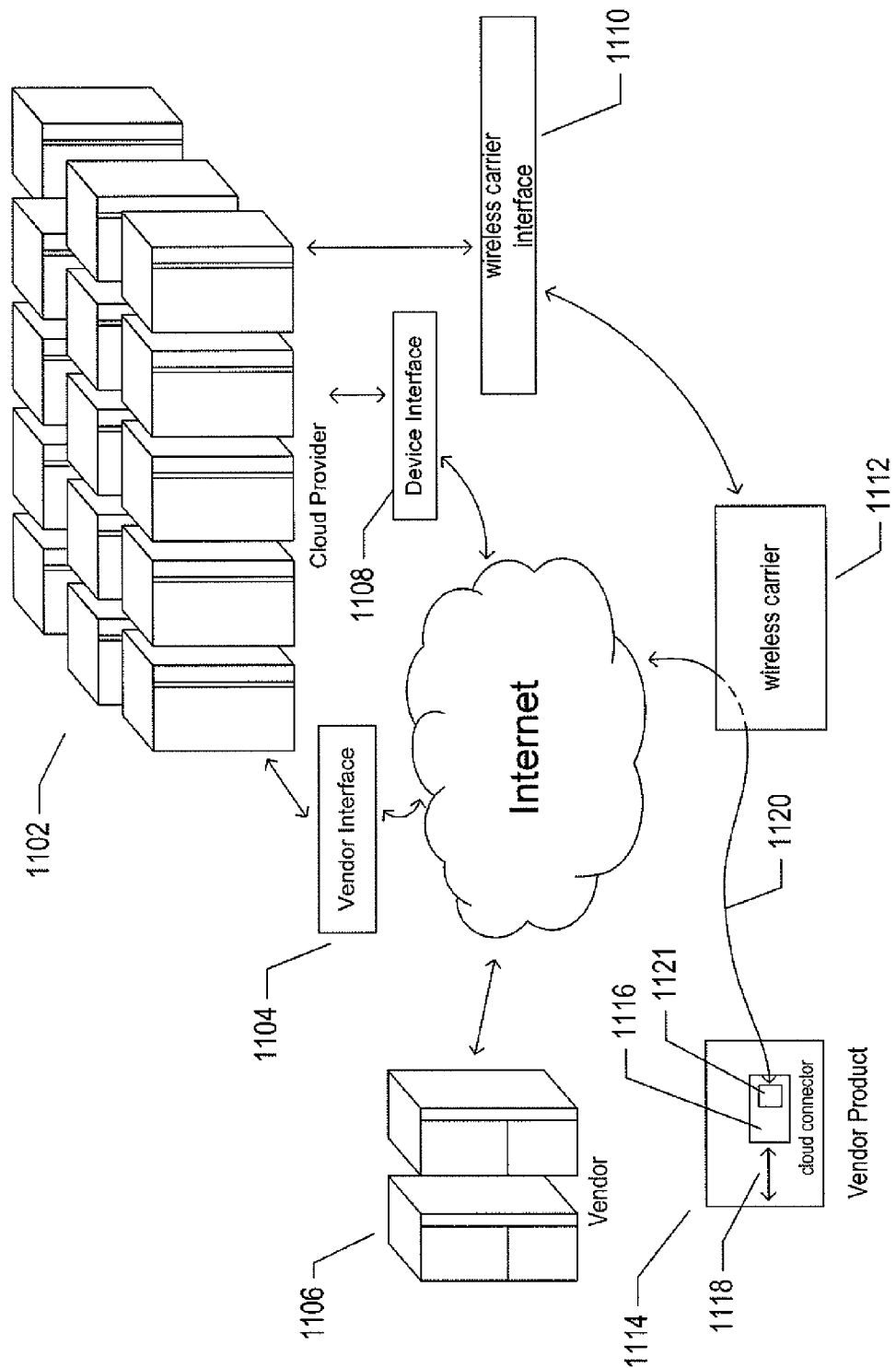
FIG. 11 illustrates the cloud-connecting technologies to which the current application is directed.

The current application is directed to embedded, wireless cloud-connector devices and systems that interconnect and manage these devices which allow cloud computing to be extended geographically and into many different geographically dispersed, low-cost, and/or high-volume applications. FIG. 11 illustrates the cloud-connecting technologies to which the current application is directed. As shown in FIG. 11, a cloud provider 1102 provides cloud-connection capabilities to vendors, such as small-sized and medium-sized businesses or research organizations that wish to exchange data with cloud-connected devices, including vendor products, containing embedded cloud-connector devices. The cloud provider provides a vendor interface 1104 to vendors 1106 that allow vendors to contract for cloud-connection services, to configure cloud-connected and cloud-connector devices, to deploy application programs that exchange data with cloud-connected devices, and to access other such vendor services. The cloud provider additionally provides a device interface 1108 to which cloud-connected devices send data to the cloud provider and cloud-resident or cloud-connected applications and from which cloud-connected devices receive data. The cloud provider also provides a wireless-carrier interface 1110 through which wireless carriers 1112 can contract and negotiate provision of services to the cloud provider as well as control, to a certain extent, cloud-connector devices. The cloud-connected devices, such as a vendor product 1114, include, as a subcomponent, an embedded, wireless cloud-connector device 1116 provided by the cloud provider. The embedded, wireless cloud-connector device 1116 interfaces 1118 to a microprocessor or microcontroller within the vendor product as well as to a wireless carrier 1112 in order to transmit data from the vendor product to a vendor application running within, or accessible to, the cloud-computing facilities 1102.

The currently described embedded, wireless cloud-connector devices and cloud-provider systems and interfaces that interconnect, manage, and maintain the embedded, wireless cloud-connector devices on behalf of a vendor allow a cloud provider to address the various hurdles and barriers, discussed above, that otherwise would inhibit extension of cloud computing to many geographically dispersed, nigh-volume, and/or low-cost applications. First, the processing and communications integrated circuits 1120 are incorporated within a cloud-connector device 1116 that provides a relatively simple communications interface to vendor-product processing devices. The cloud provider, or a vendor of cloud-connector devices, assumes the responsibility for the design, integration, and incorporation of the communications and computing integrated circuits into a well-defined embedded, wireless cloud-connector device with a simple communications interface. Furthermore, because the cloud provider contracts with wireless carriers and other communications-services providers for communications-service provision to the embedded, wireless cloud-connector devices, the enormous hurdle associated with securing communications services, by vendors, for myriad monitors and products is removed. Furthermore, because of the economy of scale, the cloud provider is likely to be able to secure communications-services rates based on the amount of data transferred, the number of messages transferred, the number of connections made, or by some other economical fee-computing method rather than service subscriptions or monthly fee-based rates for the embedded, wireless cloud-connector devices.

Figure 12:
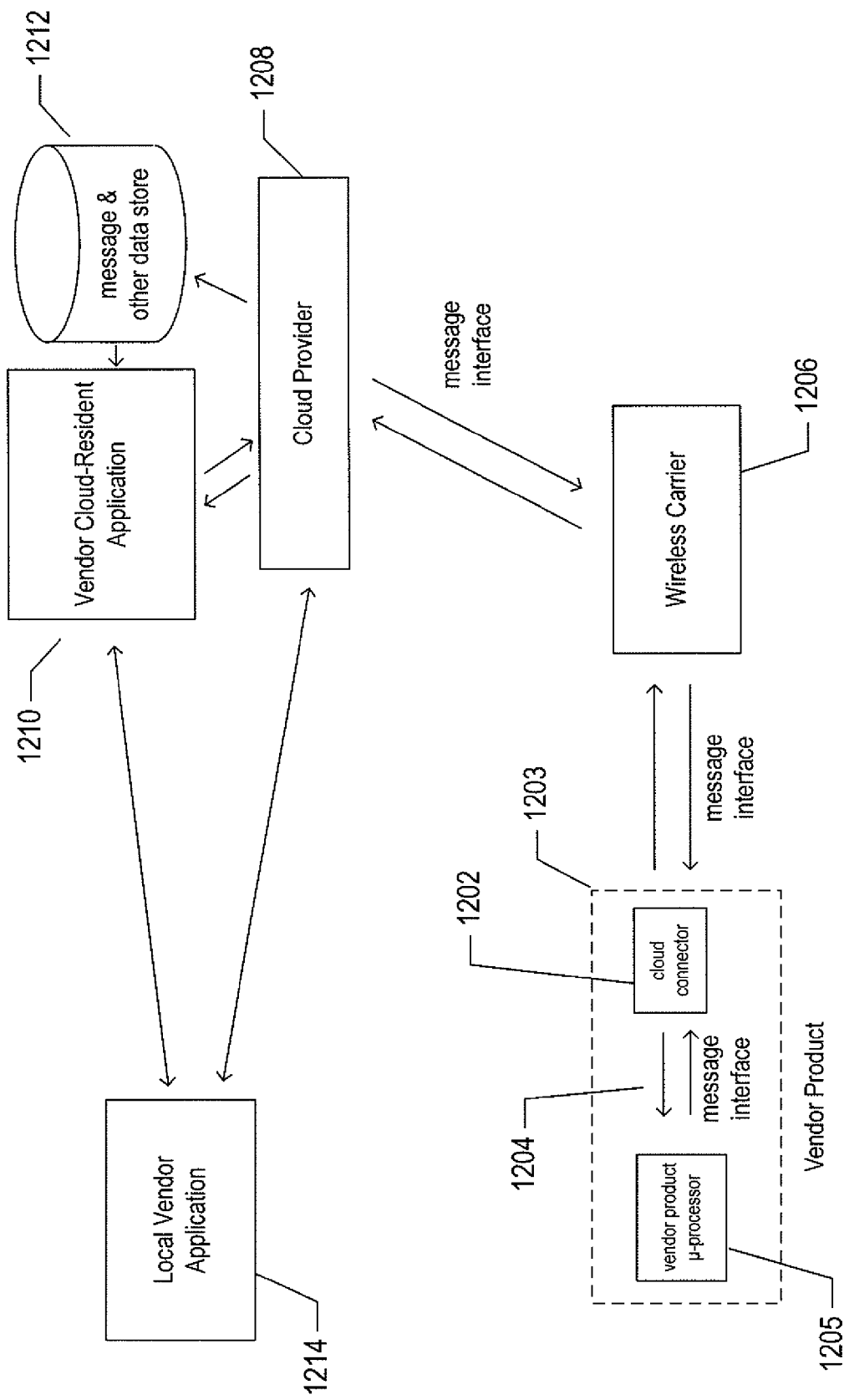
FIG. 12 illustrates a general model for extending cloud-computing services to low-cost and/or geographically-dispersed applications based on embedded, wireless cloud-connector devices.

FIG. 12 illustrates a general model for extending cloud-computing services to low-cost and/or geographically-dispersed applications based on embedded, wireless cloud-connector devices. The embedded, wireless cloud-connector device 1202 is incorporated into a vendor product or monitor and provides a message and control interface 1204 to a vendor-product microprocessor or microcontroller. This allows the vendor product to send and receive data messages through a wireless carrier 1206 and the Internet to a cloud provider 1208. The cloud provider can route received messages either directly to a cloud-resident vendor application 1210, to a data store 1212 from which the cloud-resident vendor application can retrieve the messages, or, through the Internet or a local area network, to a local vendor application 1214, among many alternative routing methods that can be used by the cloud provider. Similarly, the local vendor application, cloud-resident vendor application, and/or the cloud-resident vendor application can send messages through the cloud provider and cloud-connector device 1202 to a vendor product.

Figure 13:
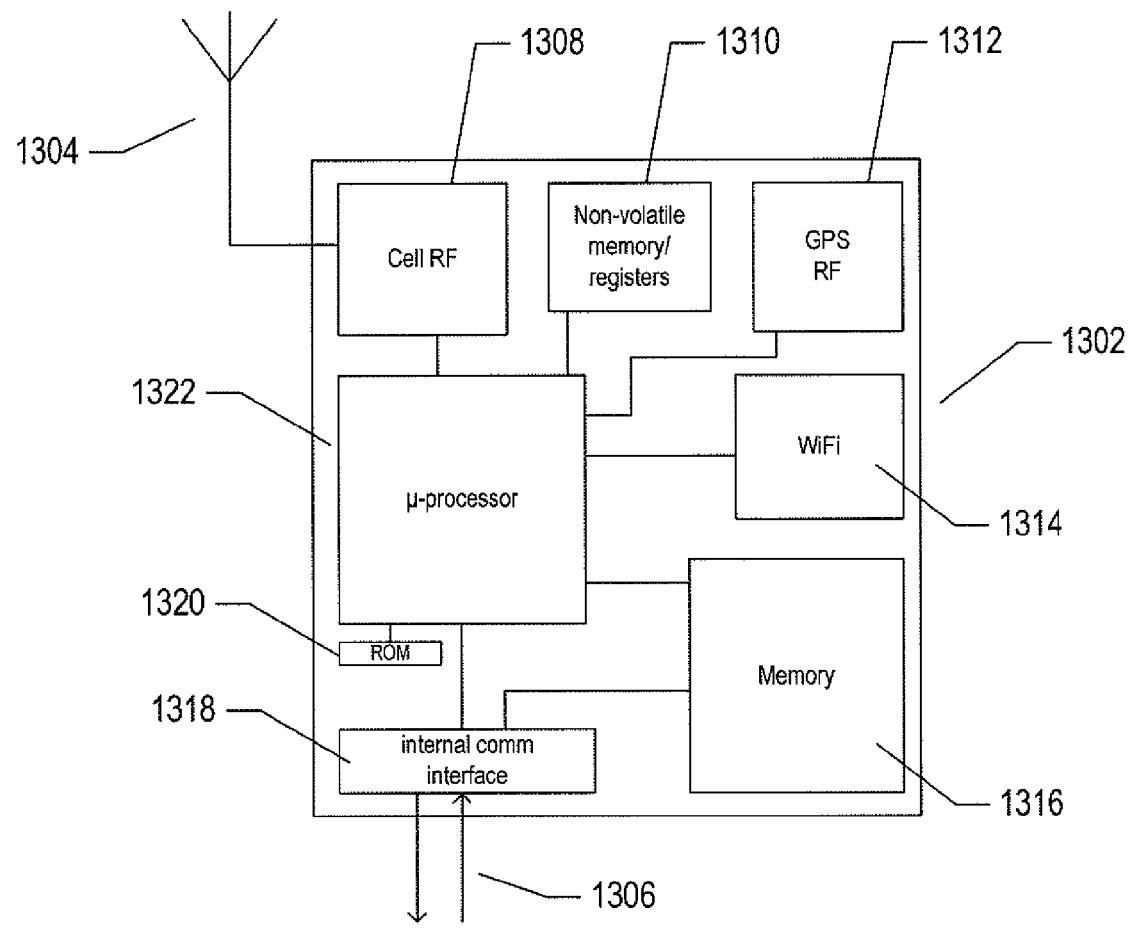
FIG. 13 illustrates one implementation of a cloud-connector-device integrated circuit.
Figure 14:
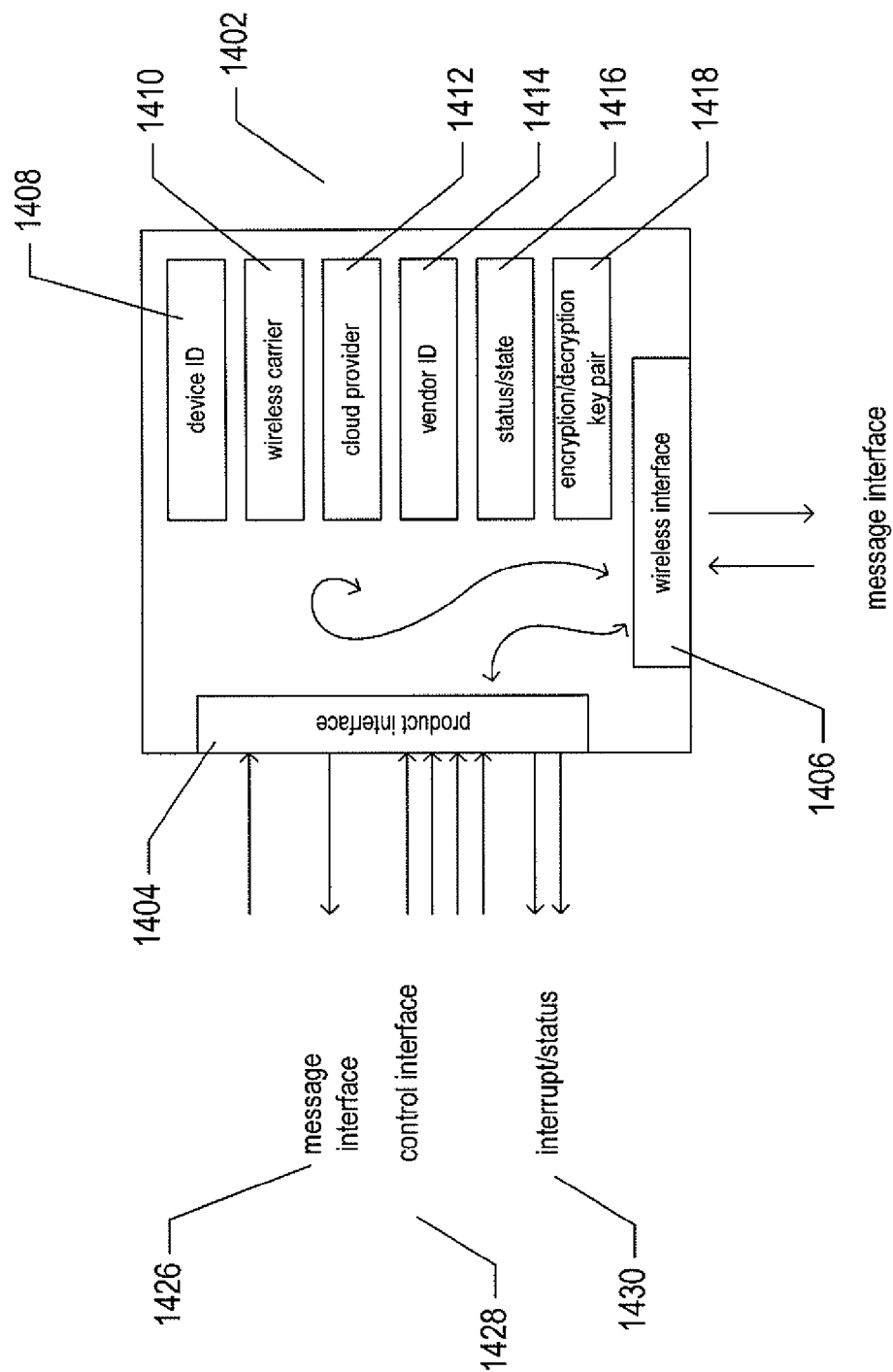
FIG. 14 illustrates the logical structure of one implementation of a cloud-connector device.

FIG. 13 illustrates one implementation of a cloud-connector-device integrated circuit. The cloud-connector-device integrated circuit 1302 includes an RF antenna 1304 and a simple communications interface 1306, such as an inter-integrated circuit ("i2c") or serial-peripheral interface ("SPI") types of serial connection that provides for limited message framing. The cloud-connector-device integrated circuit may be a single integrated circuit or a chip set with cellular RF communications logic 1308, non-volatile memory or registers 1310, GPS RF-communications logic 1312 in those cases that GPS functionality is desired, a Wi-Fi communications module 1314, electronic memory, such as SD-RAM memory 1316, the communications-interface control logic 1318, a small amount of READ-ONLY memory 1320, and a microprocessor or microcontroller 1322. The cloud-connector-device integrated circuit is the processing and communications component of a cloud-connector device, which may additionally include a power supply and power management module or power input from the embedding cloud-connected device, one or more sensors and sensor electronics, and additional circuitry and processing components, FIG. 14 illustrates the logical structure of one implementation of a cloud-connector device. The cloud-connector device 1402 can be thought of as comprising a vendor-product interface 1404, a wireless interface 1406, and certain internal data, including a device ID 1408, the address/identifier for a wireless carrier 1410, an identifier/address for a cloud provider 1412, a vendor identifier 1414, a current status or state 1416, and an encryption/decryption key pair 1418. The vendor-product interface 1404 provides a simple message, interface 1426, a simple control interface 1428, and a simple interrupt and/or status interface 1430. The control and interrupt/status interfaces may be signal lines interconnected with cloud-connector pins and the message interface may be a serial or parallel bus. The wireless interface 1406 comprises an RF antenna and various communications modules within the integrated circuit or chip set that allow 3G, 4G, or Wi-Fi connection and communications with various wireless-communications-services providers.

Figure 15:
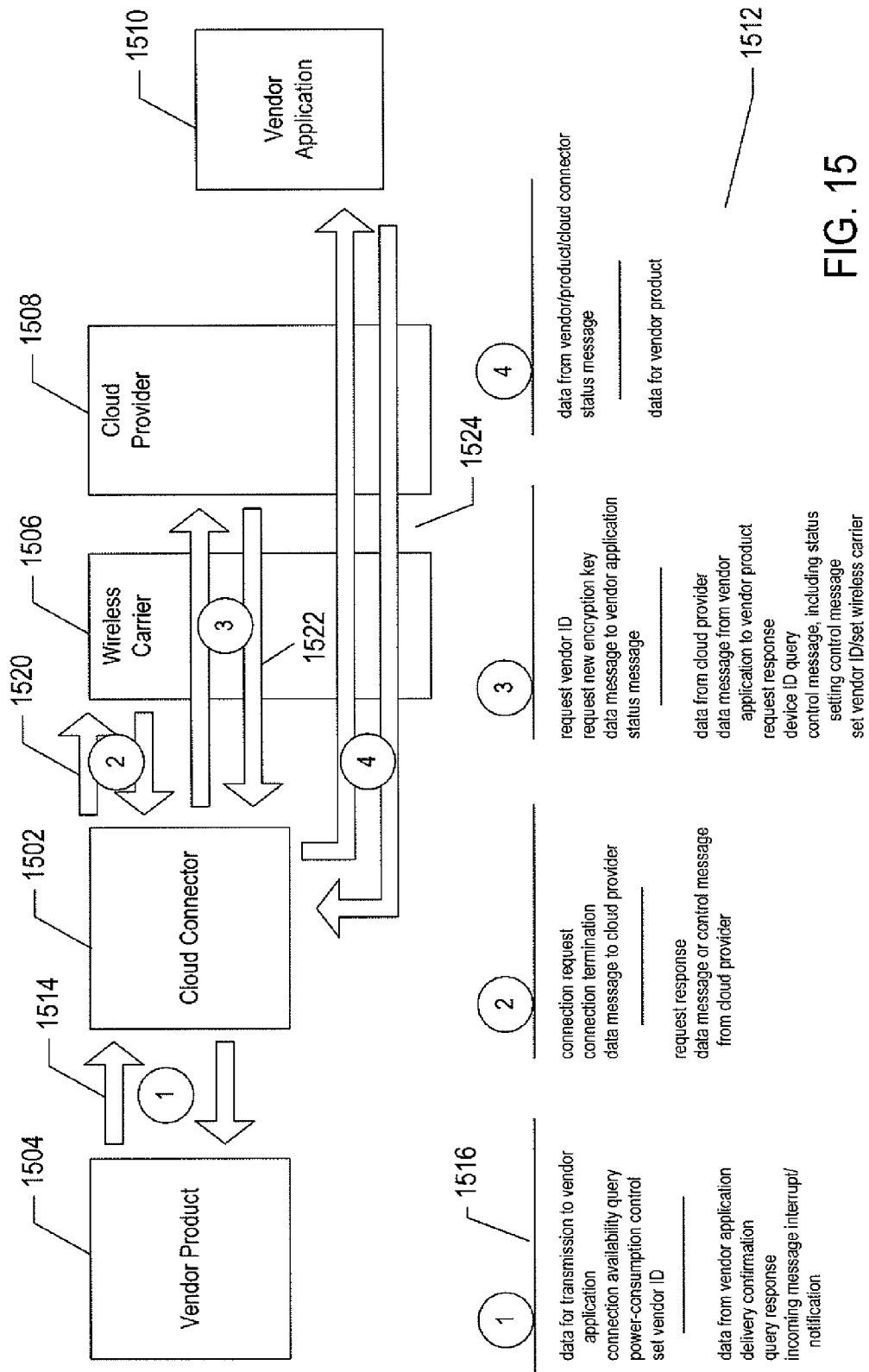
FIG. 15 illustrates various types of information transfer facilitated by various cloud-connector-device implementations to which the current application is directed.

FIG. 15 illustrates various types of information transfer facilitated by various cloud-connector-device implementations to which the current application is directed. FIG. 15 shows various types of information-exchange interfaces between the cloud-connector 1502 and the vendor product 1504 in which the cloud-connector device is embedded, a wireless carrier 1506, a cloud provider 1508, and a vendor application 1510. Various types of communications and control provided by the information-exchange interfaces are listed, in table form, in the lower portion of FIG. 15 1512. For example, the information-exchange interface between the cloud connector 1502 and vendor product 1514 is provided in table 1516. Each information-exchange interface is numerically labelled in FIG. 15 in order to logically connect the tables in the lower portion 1512 of FIG. 15 with a corresponding information-exchange interface.

The information-exchange interface 1514 between the cloud connector and vendor product allows the vendor product to transfer data to the cloud connector for transmission to a vendor application. The vendor product may also transmit a query as to the availability of a wireless connection to the cloud-connector and may, in certain cases, input a vendor ID to the cloud connector that the cloud connector can use to identify the vendor and/or vendor product within which the cloud connector is embedded. The information-exchange interface 1514 additionally allows the vendor product to carry out various types of control operations, including transitioning the cloud-connector device to one or more low-power-consumption modes in order to minimize energy consumption by the cloud connector. The cloud-connector transfers data received from the vendor application to the vendor product, to provide data-message-delivery confirmation to the vendor product with respect to data messages sent by the vendor product to the vendor application, to provide connection-availability information in response to a connection-availability query from the vendor product, and to provide message-availability status or an interrupt to the vendor product when a message is received for the vendor product from the vendor application.

The information-exchange interface 1520 between the cloud connector and wireless carrier allows the cloud connector to request a connection from a wireless carrier, to terminate connections, and to transfer data messages to the cloud provider. The wireless carrier can respond to the connection request and can transfer data or control messages from the cloud provider to the cloud connector. Information-exchange interface 1522 may allow the cloud connector to request a vendor ID, in certain cases, from the cloud provider, to request a new encryption key or encryption/decryption key pair from the cloud provider, allows the cloud-connector device to transfer a data message from the vendor product to the cloud provider, and allows the cloud-connector device to transfer various status messages to the cloud provider, including various types of error messages or indications of cloud-connector-device status changes. Information-exchange interface 1522 allows the cloud provider to transfer data messages from the cloud provider or from a vendor application to the cloud-connector device, to respond to requests from the cloud-connector device, to query the cloud-connector device to obtain the device ID, to set the vendor ID or the wireless-carrier identifier/address, in certain cases, and to send various control messages to the cloud-connector device, including control messages to change the status of the cloud-connector device. The information-exchange interface 1524 between the cloud-connector and vendor application generally allows transfer of data messages from the vendor product to the vendor application transfer of data from the vendor application to the vendor product.

Figure 16:
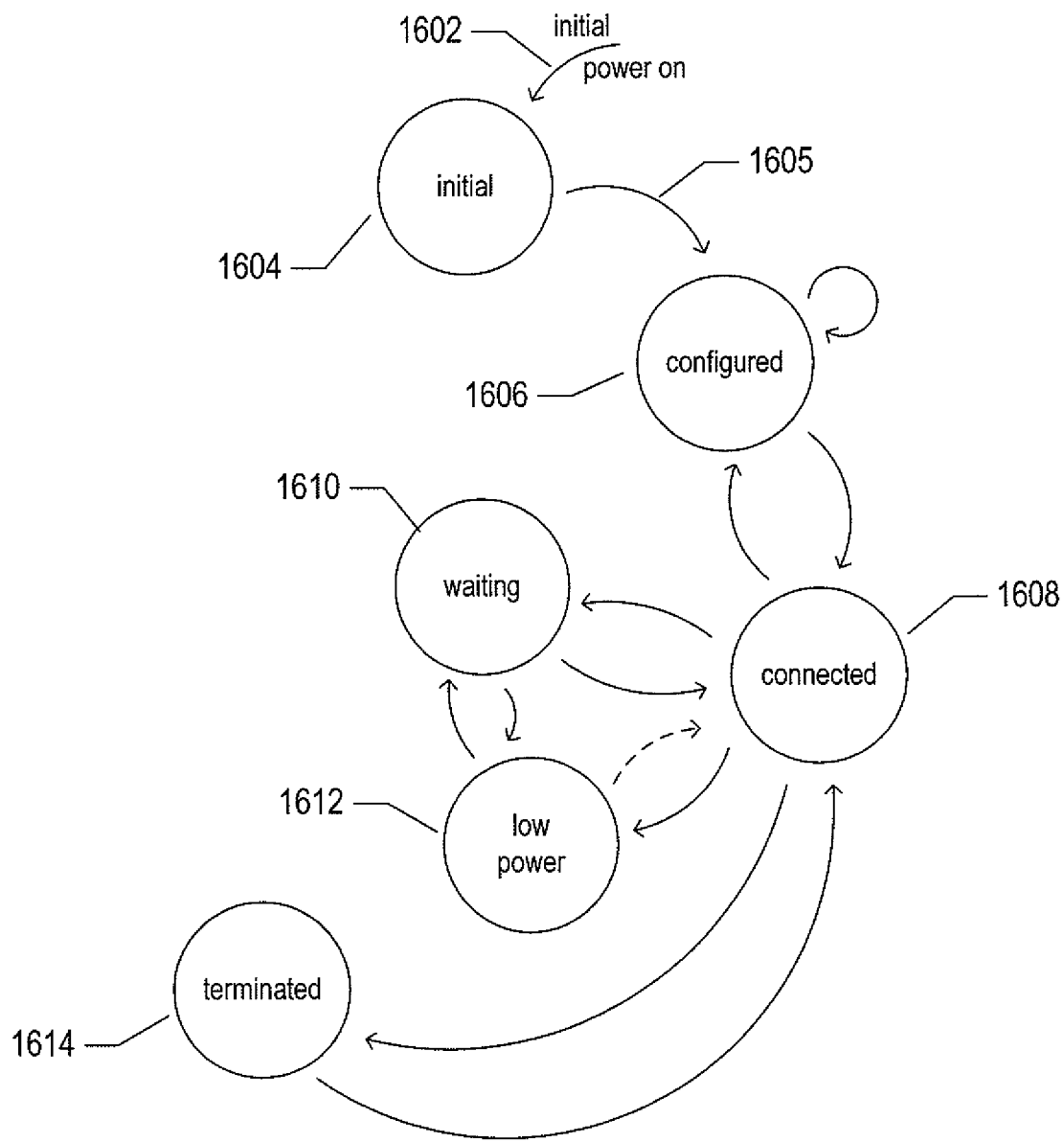
FIG. 16 shows a state-transition diagram for one implementation of the cloud-connector device to which the current application is directed.

FIG. 16 shows a state-transition diagram for one implementation of the cloud-connector device to which the current application is directed. The state-transition diagram shown in FIG. 16 is but one of many possible, similar state-transition diagrams that represent the state transitions for various different types of embedded, wireless, cloud-connector devices. In FIG. 16, states are represented by labelled circles, such as circle 1604, and transitions are represented by curved arrows, such as arrow 1605. As discussed above with reference to FIG. 14, the cloud-connector device can be considered to be a vendor-product interface, a wireless interface, logic for sending and receiving data through these interfaces, and a number of state, identifier, identifier/address, and secure-data-transmission values, such as an encryption-key/decryption-key pair. In general, the cloud-connector device serves primarily as an electronic-information-transfer conduit from a vendor-product device, monitoring device, or other microcontroller or micro-processor-controlled electronic device and a cloud-resident or cloud-connected application program. In addition, the cloud-connector device also provides certain control interfaces that allow a cloud provider, the electronic device in which the cloud-connector device is embedded, and/or the cloud-resident or cloud-connected vendor application to control the state and operation of the cloud-connector device, to certain extents.

in one implementation, when the cloud-connector device is initially powered on 1602, the cloud-connector device enters an initial state 1604 in which the cloud-connector device attempts to configure itself, as needed, with the various state and other values shown in FIG. 14. In certain cases, the device ID (1408 in FIG. 14) may be hardwired into the cloud-connector device and immediately available. In other cases, the device ID may be supplied to the device by the electronic device in which the cloud-connector device is embedded through the vendor-product interface (1404 in FIG. 14). Similarly, the wireless-carrier identifier (1410 in FIG. 14), cloud-provider identifier (1412 in FIG. 14), and vendor ID (1414 in FIG. 14) may have already been stored in a read-only memory ("ROM") within the cloud-connector device, such as having been burned into an electrically erasable programmable read-only memory ("EEPROM"), or may be supplied through one or both of the vendor-product and wireless interfaces (1404 and 1406 in FIG. 14), depending on the particular cloud-connector device implementation and the application in which the cloud-connector device is deployed. As one example, the wireless-carrier identifier (1410 in FIG. 14) may be burned into an EEPROM within the cloud-connector device by the cloud provider as part of shipment of the cloud-connector device to a vendor. Alternatively, the cloud-connector device may attempt to connect to currently accessible wireless carriers, when first powered on, and may set the wireless-carrier identifier to identify a wireless carrier that accepts the cloud-connector device's connection request. The cloud-provider identifier (1412 in FIG. 14) may be burned into a cloud-connector-device-resident EEPROM by a particular cloud provider prior to, or as part of, shipping the cloud-connector device to a vendor.

There are a variety of different possible strategies and techniques by which the cloud-connector device achieves an initial configuration sufficient to allow the cloud-connector device to connect to a wireless carrier or other communications service and transition from the configured state 1606 to the connected state 1608. The different strategies and techniques may be largely predetermined by the commercial model according to which the cloud-connector device is deployed. For example, in one model, a cloud provider provides the cloud-connector devices to vendor clients of the cloud provider in order to increase the level and volume of cloud-computing services provided to clients and to extend cloud computing to various low-cost vendor products. In this case, the cloud provider may burn in the cloud-provider identifier (1412 in FIG. 14) to ensure that the cloud-connector device is, and remains, associated with the cloud provider. The cloud provider may elect to allow the cloud-connector device to seek connection for one or more wireless carriers, to allow the cloud provider to continuously negotiate for best services pricing from multiple wireless carriers and change wireless carriers following connector-device deployment. The cloud provider may also burn in the vendor ID to ensure that a cloud-conductor connector device cannot be reconfigured and used by third-parties other than the vendor to which the cloud provider initially sells the cloud-connector device. The cloud provider may input an initial encryption/decryption key pair into ROM within the cloud-connector device to ensure that all communications between cloud-connector device and cloud provider are secure, including the initial message sent by the cloud-connector device to the cloud provider following initial power-up. Both of the encryption/decryption keys may be subsequently updated by the cloud provider on the cloud provider's initiative or in response to a key-update request front the cloud-connector device. In another case, a manufacturer and seller of cloud-connector devices may burn in the cloud-provider identifier prior to, or as part of, the process of transferring or shipping cloud-connector devices to a purchasing cloud provider.

Once values of the various ID/address and state fields have been established by retrieving the values from an internal EEPROM or receiving the values through one of the two communications interfaces, and once the cloud-connector device has configured itself sufficiently to initiate a wireless connection with a wireless carrier or other communications-services provider, the cloud-connector device transitions to the configured state 1606, with corresponding update of the status/state value or register (1416 in FIG. 14). The cloud-connector device next transitions to the connected state 1608 by successfully connecting to a wireless carrier. In one implementation, the cloud-connector device transmits, as part of the connection request, the cloud-provider identifier, allowing the wireless provider to determine whether or not the wireless provider is currently accepting connection requests on behalf of the cloud provider. The transition from the configured to connected state may be initiated by the cloud-provider device, according to built-in logic, may be initiated by a control command input to the cloud-connector device through the vendor-product interface, or by either technique depending on the particular implementation, use or application, and/or other considerations. For example, in certain implementations, the cloud-connector device may automatically periodically connect to a wireless carrier in order to exchange data and control information with the cloud provider and/or vendor application. In other cases, cloud-connector interaction requests may be initiated only by the electronic device in which the cloud-connector device is embedded. Similarly, a cloud-connector device may remain connected to the wireless carrier for an internally specified period of time or for only a sufficient period of time to transfer any pending data and control information from the vendor product to the vendor application or from the vendor application cloud provider to the cloud-connector device and/or vendor product. In certain implementations, the vendor product may be responsible for terminating each connection and transitioning the cloud-connector device from the connected state 1608 to a waiting state 1610 or to a low-power state 1612. Transitions between the connected, waiting, and low-power states may, in different implementations, be initiated by the vendor product, by the cloud-connector device, or by control commands received by the cloud-connector device from the cloud provider or vendor application. In the low-power state, the cloud-connector device may be minimally powered only to be able to be awaked by a subsequent command in order to transition to the waiting state 1610. In certain implementations, the cloud-connector device may transition from the low-power state back to the connected state 1608 in response to signals transmitted from the wireless carrier to the cloud-connector device, in turn initiated by the cloud provider or vendor application.

In many implementations there is a terminated state 1614 to which the cloud connector transitions upon receiving control commands from the cloud provider or, in certain cases, from the vendor application. In many cases, it is desirable for any of the vendor, wireless carrier, or cloud provider to be able to shut down any particular cloud-connector device that is malfunctioning or has possibly been tampered with and repurposed, or when operation of the cloud-connector device is no longer desired by the vendor or cloud provider. In many implementations, the terminated state is, to some degree, temporary or intermittent, with the cloud-connector device periodically reawakening and attempting to reconnect to a communications-services provider so that a previously terminated cloud-connector device can he resumed or restarted.

Figure 17:
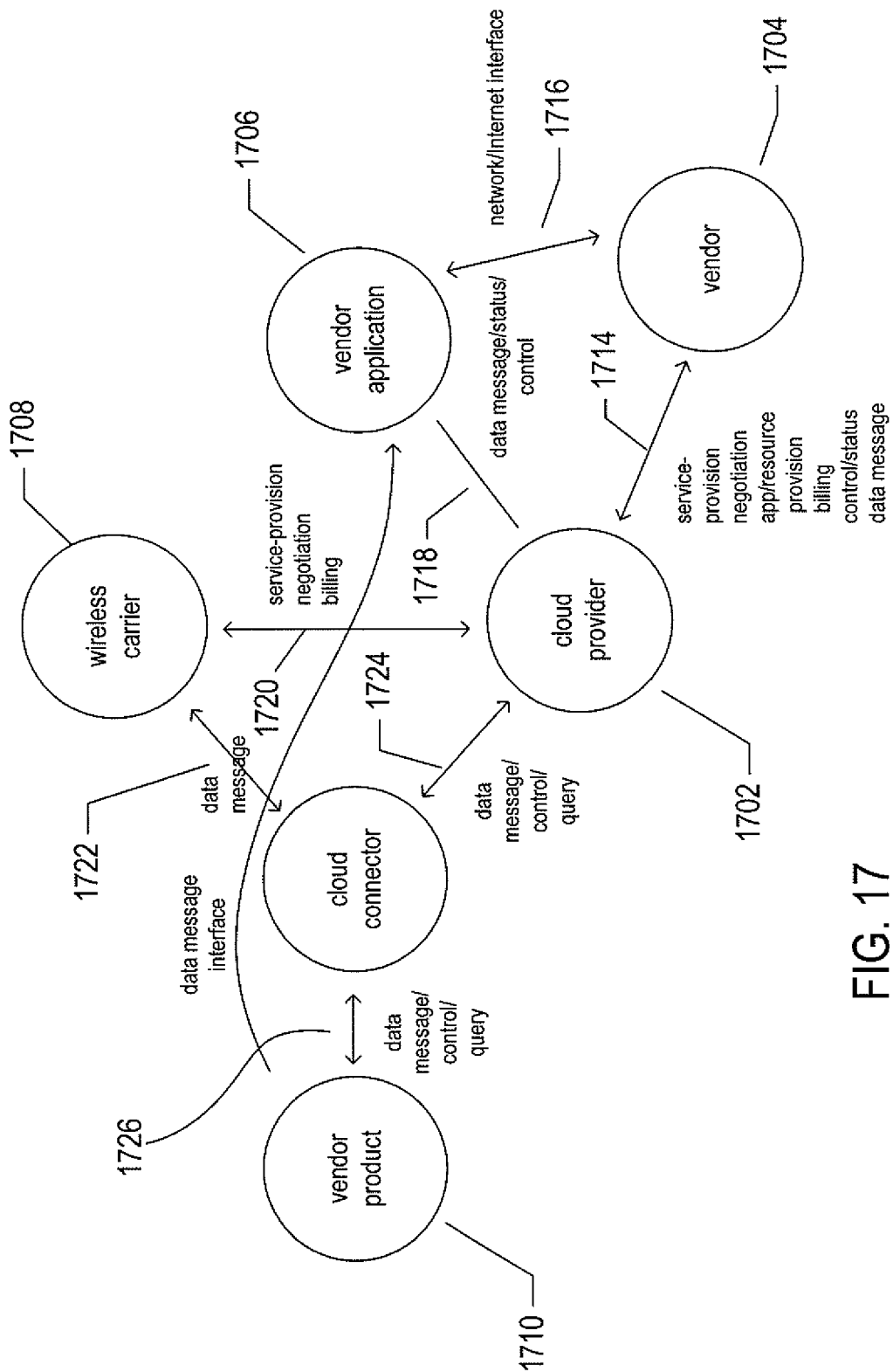
FIG. 17 shows various different interfaces between entities that use, provide services to, or are associated with a cloud-connector device.

FIG. 17 shows various different interfaces between entities that use, provide services to, or are associated with a cloud-connector device. As discussed above, these entities include a cloud provider 1702, a vendor 1704, a cloud-resident or cloud-connector vendor application 1706, a wireless carrier or other communications-services provider 1708, and a vendor product or other electronic device in which the cloud connector is embedded 1710. In FIG. 17, each interface is represented by a double-headed arrow, such as double-headed arrow 1714 representing an interface between the cloud provider 1702 and vendor 1704.

The cloud provider/vendor interface 1714 allows a vendor to negotiate and acquire cloud-connector device services from a cloud provider, including deployment of a cloud-resident vendor application 1706 and shipment of cloud-connector devices. Alternatively, the vendor may obtain cloud-connector devices from a third-party cloud-connector-device manufacturer which can be configured to communicate with the cloud provider. The cloud-provider/vendor interface 1714 also provides for billing by the cloud provider for communications services provided by the cloud provider to the vendor with respect to some number of cloud-connector devices. The billing may be structured according to a variety of different billing methods. A vendor may be billed on a per-message or per-transferred-byte basis, on a bulk subscription basis, on a cost calculated from varying costs charged to the cloud provider by the wireless carrier, and according to other billing structures and methods. The cloud provider/vendor interface 1714 may also allow the vendor to exercise or request certain control operations with respect to particular cloud-connector devices, such as shutting down one or more cloud-connector devices or broadcasting or transmitting to individual cloud-connector devices data, such as firmware or software updates for the electronic devices in which the cloud-connector devices are embedded. The cloud provider/vendor interface 1714 may, in addition, provide for direct data-message delivery to the vendor from one or more vendor products or cloud-connector devices embedded within vendor products.

In general, the vendor 1704 and a cloud-resident vendor application 1706 are interconnected by a network and/or Internet interface 1716. For example, a cloud-resident vendor application may collect data, over time, from many different cloud-connector devices embedded within vendor products and provide reports and data-analysis results to the vendor through a Web interface or by network-transmitted data on a periodic basis. In addition, the vendor-application/vendor interface 1716 may be designed by the vendor to allow the vendor to request particular data-transfer and control operations with respect to particular individual electronic devices or groups of electronic devices within which cloud-connector devices are embedded.

An interface 1718 between the cloud provider 1702 and vendor application 1706 provides a vendor application with data messages sent from the vendor products containing cloud-connector devices and allows a vendor application to transfer data messages and certain control commands through the cloud provider and cloud-connector devices to the vendor products and, in certain cases, directly to the cloud-connector device. As one example, the vendor application 1706 may, at certain times or upon vendor request, query vendor products for status and for data collected by the vendor product or cloud-connector device.

An interface 1720 between the cloud provider 1702 and wireless carrier 1708 allows the wireless carrier to bill the cloud provider communications services provided by the wireless carrier to the cloud provider with respect to one or more cloud-connector devices. This interface may also allow for human-negotiated, or automated negotiation of, service-provision contracts, service-fee updates, and other such transactions and information transfer. An interface 1722 between the cloud-connector device and wireless carrier generally is a communications connection established according to well-known protocols to allow data messages to be exchanged between the cloud-connector device and wireless carrier. The interface also supports connection requests and connection termination.

An interface 1724 between the cloud provider and cloud-connector devices allows the cloud provider to send data messages, via a wireless carrier, to the cloud-connector device as well as certain control messages and queries. The cloud provider, for example, may query the cloud-connector device for values of certain of the identifiers and identifier/address values stored within the cloud-connector device. The cloud provider may also send control messages to change the state of the cloud-connector device, such as a termination control message that causes the cloud-connector device to transition to the terminated state (1614 in FIG. 16). Finally, an interface 1726 (1404 in FIG. 14) provides data exchange between the cloud-connector device and an electronic product in which the cloud-connector device is embedded. In addition, this interface allows the electronic device in which the cloud-connector device is embedded to pass certain control commands to the cloud-connector device, such as power-management commands. The electronic device on which the cloud-connector device may also query the state of the cloud-connector device, in certain implementations, as well as the availability of wireless connections.

To reiterate, although there are a variety of different particular implementations, techniques, and methods for commercial and technical deployment of cloud-connector devices, and many different uses and applications for cloud-connector devices, the cloud-connector device to which the current application is directed generally represents a means by which a cloud provider can extend cloud-computing services both geographically as well as to many low-cost and/or high-volume uses and applications that would be otherwise infeasible due to hurdles associated with incorporating computing and communications technology into vendor products and other cloud-connected devices and arranging for communications-services-provision to low-cost devices. Because the cloud provider contracts directly with wireless carriers, Wi-Fi service providers, and other communications-services providers, the cloud provider can negotiate for lowest-possible communications-services costs, billing structures conducive to various low-cost, high-volume, intermittent, and/or geographically dispersed applications, and can alleviate much of the billing overhead and peak-demand-provisioning overheads and wastes that would otherwise be associated with cloud-connector devices, much as cloud providers currently provide computing cloud-computing services to cloud-computing customers.

Although the present invention has been described in terms of particular embodiments, it is not intended that the invention be limited to these embodiments. Modifications within the spirit of the invention will he apparent to those skilled in the art. For example, as discussed above, cloud-connector devices may be implemented and used for many different types of applications in many different environments. As one example, a cloud-connector device may incorporate a GPS module to allow the cloud-connector device to continuously monitor the location of the cloud-connector device. A cloud-connector device may be implemented to include many other different types of electro-mechanical or electro-optico-mechanical sensors and monitors, the data generated by which may be stored or transferred to the electronic device in which the cloud-connector device is embedded and/or to a cloud-resident vendor application. A GPS module can facilitate, as one example, tracking and locating of electronic devices in which cloud-connector devices are embedded. A cloud-connector device may use many different types of microcontrollers and microprocessors, communications modules, power-management units, and other circuitry and processing entities. In many cases, all of the processing components and functionality may be incorporated within a single integrated circuit or a very few integrated circuits that together comprise a chip set. Firmware and software routines that control operation of a cloud-connector device can be implemented in many different ways by varying any of many different implementation parameters, including programming language or languages, type of control program or operating system, control structures, data structures, and other such implementation parameters. These implementations may control a cloud-connector device to operate according to any of various different state-transition diagrams, such as he state-transition diagram shown in FIG. 16. They may also facilitate many different types of communications capabilities of cloud-connector devices. For example, a cloud-connector device may be implemented only to provide for transmission of very small text messages, at one extreme, or may be implemented by a full communications stack to allow for various types of communications functionality, including guaranteed delivery, message sequencing, link-level encryption, and other such functionalities.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A cloud-connector device comprising:
an integrated circuit or a set of integrated circuits that include:
one or more processing units,
one or more communications modules, and
one or more electronic memories;
a first communications interface that is publicly documented and through which data, control commands, and status are exchanged between the cloud-connector device and a microprocessor-controlled or micro-controller-controlled electronic device in which the cloud-connector device is embedded;
data values stored in at least one of the one or more electronic memories, the data values including a current-state value, a device identifier, a cloud-provider identifier, and a wireless carrier identifier/address; and
a second, wireless communications interface that allows the cloud-connector device to connect to, and exchange at least some of the data with, a wireless carrier that bills a cloud provider identified by the cloud-provider identifier for transmitting the at least some of the data through the second, wireless communications interface between the cloud-connector device and the cloud provider.

2. The cloud-connector device of claim 1 wherein the first communications interface includes:
a serial or parallel bus for data-message transmission;
control signal lines for input of the control commands from the microprocessor-controlled or micro-controller-controlled electronic device in which the cloud-connector device is embedded to the cloud-connector device; and
one or more status control lines for reporting the status by the cloud-connector device to the microprocessor-controlled or micro-controller-controlled electronic device in which the cloud-connector device is embedded.

3. The cloud-connector device of claim 1 wherein the first communications interface further includes an interrupt signal line by which the cloud-connector device informs the microprocessor-controlled or micro-controller-controlled electronic device in which the cloud-connector device is embedded of available incoming data messages.

4. The cloud-connector device of claim 1 wherein the second, wireless communications interface comprises:
a radio-frequency antenna; and
one or more wireless-communications modules.

5. The cloud-connector device of claim 1 wherein the second, wireless communications interface supports connection to one or more of:
a mobile-phone carrier; or
a Wi-Fi provider.

6. The cloud-connector device of claim 1 wherein the microprocessor-controlled or micro-controller-controlled electronic device in which the cloud-connector device is embedded is a vendor device that transmits data messages to a cloud-resident or cloud-connected vendor application and that receives data messages from the cloud-resident or cloud-connected vendor application through the first communications interface.

7. The cloud-connector device of claim 6 wherein an individual data message is transmitted, from the vendor device to the cloud-resident or cloud-connected vendor application, by:
   transmitting the individual data message by the vendor device to the cloud-connector device through the first communications interface;
   transmitting the individual data message by the cloud-connector device to the wireless carrier through the second, wireless communications interface;
   transmitting the individual data message by the wireless carrier through a network to the cloud provider; and
   routing the individual data message by the cloud provider to the cloud-resident or cloud-connected vendor application.

8. The cloud-connector device of claim 1 wherein the wireless carrier bills the cloud provider identified by the cloud-provider identifier for data transmission through the second, wireless communications interface between the cloud-connector device and the cloud provider by:
   tracking the data transmission from the cloud-connector device to the wireless carrier and from the wireless carrier to the cloud-connector device, using the cloud-provider identifier;
   periodically computing a fee for data transmission from the cloud-connector device to the wireless carrier and from the wireless carrier to the cloud-connector device; and
   billing the cloud provider for the fee.

9. The cloud-connector device of claim 8 wherein the wireless carrier computes the fee based on one or more of:
   a cumulative number of data messages transferred from the cloud-connector device to the wireless carrier and from the wireless carrier to the cloud-connector device since a time at which the fee was last computed for the cloud-connector device;
   a cumulative number of bytes transferred in the data messages transferred from the cloud-connector device to the wireless carrier and from the wireless carrier to the cloud-connector device since the time at which the fee was last computed for the cloud-connector device;
   elapsed time between a current time and the time at which the fee was last computed for the cloud-connector device;
   a cumulative time during which the cloud-connector device has been connected to the wireless carrier since the time at which the fee was last computed for the cloud-connector device; or
   a number of connection requests received by the wireless carrier from the cloud-connector device since the time at which the fee was last computed for the cloud-connector device.

10. The cloud-connector device of claim 1:
    wherein the cloud-connector device stores data messages received through the second, wireless communications interface in at least one of the one or more electronic memories for subsequent retrieval and delivery to the microprocessor-controlled or micro-controller-controlled electronic device in which the cloud-connector device is embedded; and
    wherein the cloud-connector device stores other data messages received through the first communications interface for subsequent retrieval and transmission to the wireless carrier.

11. A cloud-computing system operated at least in part by a cloud provider, the cloud-computing system comprising:
    multiple computer systems that execute vendor applications on behalf of a third-party vendor, wherein the vendor applications are cloud-resident or cloud-connected;
    multiple remote wireless cloud-connector devices, each embedded in an individual vendor device of multiple vendor devices provided by the third-party vendor; and
    routing components that route first data messages from the multiple vendor devices transmitted to the vendor applications through a communications-services provider via the multiple remote wireless cloud-connector devices.

12. The cloud-computing system of claim 11 wherein the cloud-computing system provides an information-exchange interface between the cloud-computing system and the communications-services provider that allows the cloud provider to negotiate communications-services fees with the communications-services provider and contract for provision of communications services with the communications-services provider.

13. The cloud-computing system of claim 11 wherein the cloud-computing system provides an information-exchange interface between the cloud-computing system and the communications-services provider that allows the communications-services provider to transmit second data messages and control messages from the cloud-computing system to the communications-services provider for wireless transmission to the multiple remote wireless cloud-connector devices and allows the communications-services provider to transmit the first data messages, received by wireless transmission from the multiple remote wireless cloud-connector devices, to the cloud-computing system.

14. The cloud-computing system of claim 11 wherein the cloud-computing system provides an information-exchange interface between the cloud-computing system and the third-party vendor that allows the cloud provider to sell the multiple remote wireless cloud-connector devices to the third-party vendor, and to bill the third-party vendor for data transmission from the multiple remote wireless cloud-connector devices to the vendor applications and from the vendor applications to the multiple remote wireless cloud-connector devices.

15. The cloud-computing system of claim 11 wherein the cloud-computing system provides an information-exchange interface via a first one of the multiple remote wireless cloud-connector devices that allows a first one of the multiple vendor devices in which the first remote wireless cloud-connector device is embedded to transmit the first data messages and control signals to the first remote wireless cloud-connector device and to receive second data messages and status values from the first remote wireless cloud-connector device.

16. The cloud-computing system of claim 11 wherein the cloud-computing system provides an information-exchange interface via the multiple remote cloud-connector devices that allows the multiple remote cloud-connector devices to connect to the communications-services provider and exchange control messages and data with the communications-services provider.

17. A cloud-connector device comprising:
    at least one integrated circuit comprising:
    one or more processing units, and
    one or more electronic memories;

a first communications interface controlled by the one or more processing units to exchange data, control commands, and status between the cloud-connector device and an electronic device to which the cloud-connector device is connected; and a second, wireless communications interface controlled by the one or more processing units to connect the cloud-connector device with a wireless carrier, wherein the wireless carrier provides wireless communication services to a cloud provider and the wireless communication services are used to transmit at least some of the data exchanged with the electronic device through the second, wireless communications interface to the cloud provider, wherein the one or more processing units are configured to cause at least one of the one or more electronic memories to store a cloud-provider identifier of the cloud provider and a wireless carrier identifier/address of the wireless carrier that provides the wireless communication services to the cloud provider.

18. The cloud-connector device of claim 17, wherein the cloud-connector device is embedded in the electronic device to which the cloud-connector device is connected.

19. The cloud-connector device of claim 17, wherein the cloud-connector device is physically connected to the electronic device to which the cloud-connector device is connected.

20. The cloud-connector device of claim 17, wherein the one or more electronic memories store at least one encryption key configured to encrypt at least some of the data.

* * * * *